(12) United States Patent
Stumm et al.

(10) Patent No.: US 12,141,500 B2
(45) Date of Patent: Nov. 12, 2024

(54) VIRTUAL REALITY SYSTEM FOR RETAIL STORE DESIGN

(71) Applicant: Target Brands, Inc., Minneapolis, MN (US)

(72) Inventors: Robert S. Stumm, Edina, MN (US); Kameron A. Healy, Champlin, MN (US); Sarah K. Amundsen, Chaska, MN (US); Jeremy D. Montour, Forest Lake, MN (US); Matthew M. Culver, Golden Valley, MN (US); Marc J. Jensen, Golden Valley, MN (US); Paul D. Eckhardt, Austin, TX (US); Shawn A. Roske, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/819,125

(22) Filed: Aug. 11, 2022

(65) Prior Publication Data

US 2023/0055819 A1   Feb. 23, 2023

Related U.S. Application Data

(60) Provisional application No. 63/234,437, filed on Aug. 18, 2021.

(51) Int. Cl.
*G06F 3/16* (2006.01)
*G02B 27/01* (2006.01)
(Continued)

(52) U.S. Cl.
CPC ......... *G06F 3/165* (2013.01); *G02B 27/0101* (2013.01); *G02B 27/017* (2013.01);
(Continued)

(58) Field of Classification Search
CPC .......... G06F 3/165; G06F 30/13; G06F 30/12; G06F 3/011; G06F 2111/18; G06T 7/70;
(Continued)

(56) References Cited

U.S. PATENT DOCUMENTS 6,002,853 A * 12/1999 de Hond ............... G06F 16/954
                                                       709/219
6,119,147 A *  9/2000 Toomey ............. H04L 12/1831
                                                       719/329

(Continued)

FOREIGN PATENT DOCUMENTS

WO       2008125593 A2      10/2008
WO       2014014296 A1       1/2014

OTHER PUBLICATIONS

Bigscreen, Inc., Bigscreen Beta on Steam, https://store.steampowered.com/app/457550/Bigscreen_Beta/, 3 pages, Apr. 28, 2016.

(Continued)

*Primary Examiner* — Nicholas Augustine
(74) *Attorney, Agent, or Firm* — Leanne Taveggia Farrell; Westman, Champlin & Koehler, P.A.

(57) ABSTRACT

A virtual reality system includes a network, a virtual reality server coupled to the network including a voice streaming server configured to stream audio data, a plurality of computing devices coupled to the network and the virtual reality server and each having a display assembly configured to render virtual reality spaces and objects. At least one of the computing devices is a virtual reality headset that includes one or more tracking cameras configured to sense positioning of a user's hands relative to the headset worn by the user, at least one microphone and at least one speaker. The voice streaming server is activated to stream microphone audio data from the microphone to speakers associated with other of the plurality of computing devices when one of the user's (Continued)

hands associated with the headset is located a threshold distance from the tracking camera of the headset.

18 Claims, 29 Drawing Sheets

(51) Int. Cl.
  *G06F 3/01* (2006.01)
  *G06F 30/12* (2020.01)
  *G06F 30/13* (2020.01)
  *G06T 7/20* (2017.01)
  *G06T 7/70* (2017.01)
  *G06V 40/10* (2022.01)
  *G06F 111/18* (2020.01)

(52) U.S. Cl.
  CPC .......... *G02B 27/0179* (2013.01); *G06F 3/011* (2013.01); *G06F 30/12* (2020.01); *G06F 30/13* (2020.01); *G06T 7/20* (2013.01); *G06T 7/70* (2017.01); *G06V 40/10* (2022.01); *G02B 2027/0138* (2013.01); *G02B 2027/014* (2013.01); *G02B 2027/0187* (2013.01); *G06F 2111/18* (2020.01)

(58) Field of Classification Search
  CPC ...... G06T 7/20; G06V 40/10; G02B 27/0101; G02B 27/017; G02B 27/0179; G02B 2027/0138; G02B 2027/014; G02B 2027/0187
  See application file for complete search history.

(56) References Cited

U.S. PATENT DOCUMENTS

| | | | |
|---|---|---|---|
| 6,219,045 B1 * | 4/2001 | Leahy | H04L 67/10 709/204 |
| 6,362,817 B1 * | 3/2002 | Powers | G06T 17/00 345/428 |
| 6,396,522 B1 * | 5/2002 | Vu | G06F 3/04845 715/848 |
| 6,414,679 B1 * | 7/2002 | Miodonski | G06T 13/00 707/999.005 |
| 6,570,563 B1 * | 5/2003 | Honda | A63F 13/352 345/473 |
| 6,573,903 B2 * | 6/2003 | Gantt | G06F 30/00 345/619 |
| 6,784,901 B1 * | 8/2004 | Harvey | H04L 67/02 715/848 |
| 6,961,055 B2 * | 11/2005 | Doak | A63F 13/63 345/677 |
| 7,414,629 B2 * | 8/2008 | Santodomingo | G06T 17/05 345/582 |
| 7,663,625 B2 * | 2/2010 | Chartier | G06T 19/20 700/182 |
| 7,746,343 B1 * | 6/2010 | Charaniya | G06N 7/01 345/428 |
| 7,788,323 B2 * | 8/2010 | Greenstein | G06Q 10/10 715/744 |
| 7,814,429 B2 * | 10/2010 | Buffet | G06F 30/00 715/763 |
| 7,817,150 B2 * | 10/2010 | Reichard | G06T 15/20 715/705 |
| 7,844,724 B2 * | 11/2010 | Van Wie | H04L 67/131 709/227 |
| 8,812,273 B2 | 8/2014 | Trabona | |
| 9,367,950 B1 | 6/2016 | Scranton et al. | |
| 9,396,588 B1 * | 7/2016 | Li | G02B 27/017 |
| 9,524,482 B2 | 12/2016 | Yopp et al. | |
| 10,217,286 B1 * | 2/2019 | Angel | G06F 3/013 |
| 10,241,569 B2 * | 3/2019 | Lanman | G06F 3/011 |
| 10,429,644 B2 * | 10/2019 | Williamson | G01S 1/20 |
| 10,467,814 B2 | 11/2019 | Loberg et al. | |
| 10,511,833 B2 * | 12/2019 | Valdivia | G06T 19/006 |
| 10,636,208 B2 | 4/2020 | Eikhoff | |
| 10,699,488 B1 * | 6/2020 | Terrano | G06N 20/00 |
| 10,783,284 B2 | 9/2020 | Loberg et al. | |
| 10,846,937 B2 | 11/2020 | Roger et al. | |
| 10,916,065 B2 * | 2/2021 | Furtwangler | G06F 16/245 |
| 2001/0018667 A1 * | 8/2001 | Kim | G06Q 30/0277 705/14.73 |
| 2002/0113820 A1 * | 8/2002 | Robinson | G06F 16/954 715/764 |
| 2004/0128350 A1 | 7/2004 | Topfl et al. | |
| 2005/0093719 A1 * | 5/2005 | Okamoto | G01C 21/3697 705/14.62 |
| 2005/0128212 A1 * | 6/2005 | Edecker | G06T 17/05 345/581 |
| 2011/0072367 A1 | 3/2011 | Bauer | |
| 2011/0169826 A1 | 7/2011 | Elsberg et al. | |
| 2011/0205242 A1 * | 8/2011 | Friesen | A43B 3/0078 345/633 |
| 2013/0042296 A1 * | 2/2013 | Hastings | G06Q 50/184 726/1 |
| 2013/0174213 A1 * | 7/2013 | Liu | G02B 27/017 726/1 |
| 2013/0317950 A1 | 11/2013 | Abraham et al. | |
| 2017/0132567 A1 | 5/2017 | Glunz | |
| 2018/0095635 A1 * | 4/2018 | Valdivia | G02B 27/0093 |
| 2018/0129278 A1 * | 5/2018 | Luchinskiy | G06F 3/0483 |
| 2018/0307303 A1 * | 10/2018 | Powderly | G02B 27/017 |
| 2019/0251622 A1 | 8/2019 | Wiedmeyer et al. | |
| 2019/0368868 A1 * | 12/2019 | Abovitz | G02B 27/017 |
| 2020/0302681 A1 | 9/2020 | Totty et al. | |
| 2020/0302693 A1 | 9/2020 | Singh et al. | |
| 2021/0219039 A1 * | 7/2021 | Robateau | G10H 1/365 |
| 2022/0070232 A1 * | 3/2022 | Young | G06Q 10/107 |

OTHER PUBLICATIONS

One Digital Nation, CINEVR, https://cinevr.io/en, 3 pages, 2021.
Karlsson et al., Virtual Reality Locomotion: Four Evaluated Locomotion Methods, https://www.diva-portal.org/smash/get/diva2:1144090/FULLTEXT02, 69 pages, 2017.
The Great Pug, Making a Theater in VRChat or: How the Vantage Works, https://thegreatpug.com/vrchat-making-a-theater/, 4 pages, 2021.
Plex, Virtual Reality Plex, https://www.plex.tv/your-media/virtual-reality/, 13 pages, 2021.
VRChat, Inc., VRCHAT: Developer FAQ, https://hello.vrchat.com/developer-faq, 2 pages, 2020.
Zaker et al., Virtual Reality-Integrated Workflow in BIM-Enabled Projects Collaboration and Design Review: A Case Study, Visualization in Engineering, 15 pages, 2018.
Fuzor, https://www.kalloctech.com/design.jsp, 3 pages, at least as early as Jan. 12, 2021.
Prospect, IrisVR, https://irisvr.com/prospect/, 3 pages, at least as early as Jan. 12, 2021.
Symphony Retail AI, <http://www.symphonyretailai.com/knowledge-hub/evaluate-refine-store-layout-store-planning-retail-virtualization/>, 1 page, at least as early as Jan. 12, 2021.
Sampaio, Enhancing BIM Methodology with VR Technology, IntechOpen, Chapter 5, pp. 60-79, 2018.

* cited by examiner

VIRTUAL REALITY SYSTEM FOR RETAIL STORE DESIGN

CROSS-REFERENCE OF RELATED APPLICATION

The present application is based on and claims the benefit of U.S. provisional patent application Ser. No. 63/234,437, filed Aug. 18, 2021, the content of which is hereby incorporated by reference in its entirety.

BACKGROUND

Virtual reality (VR) is a technology for creating three-dimensional virtual environments with specific functionality. VR headsets may be used in combination with hand controllers to generate and render realistic images, sounds and sensations that simulate a user's physical presence in a virtual environment. In particular, the user is able to look around an artificial world, move in it, and interact with virtual features or items in a meaningful way. Each VR headset includes a display and lenses, a processor, memory both as RAM and storage, battery, head strap, integral speakers and microphones. The hand controllers include, batteries, buttons, triggers, and haptics.

The discussion above is merely provided for general background information and is not intended to be used as an aid in determining the scope of the claimed subject matter.

SUMMARY

A virtual reality system for retail store design includes a network, a virtual reality server coupled to the network including a voice streaming server configured to stream audio data and a plurality of computing devices coupled to the network and the virtual reality server. Each computing device having a display assembly configured to render virtual reality spaces and objects. At least one of the plurality computing devices is a virtual reality headset that includes one or more tracking cameras configured to sense positioning of a user's hands relative to the headset worn by the user, at least one microphone and at least one speaker. The voice streaming server is activated to stream microphone audio data from the microphone to speakers associated with other of the plurality of computing devices when one of the user's hands associated with the headset is located a threshold distance from the tracking camera of the headset.

A method of streaming microphone audio data in a virtual reality system for retail store design includes providing a plurality of computing devices coupled to a network and a virtual reality server. Each computing device has a display assembly configured to render virtual reality spaces and objects, at least microphone and at least one speaker. At least one of the computing devices includes a virtual reality headset configured to be worn by a user. With one or more tracking cameras associated with the headset, a position of the user's hands relative to the headset worn by the user is sensed. Microphone audio data from the microphone of the headset is streamed to speakers of the other of the plurality of computing devices when one of the user's hands associated with the headset is located a threshold distance from the tracking camera of the headset.

A virtual reality system for retail store design includes a network, a virtual reality server coupled to the network and a plurality of computing devices coupled to the network and the virtual reality server. Each computing device is configured to be operated by a user and includes a display assembly configured to render virtual reality spaces and objects. The virtual reality server is configured to render a virtual palette containing a plurality of available product assets in virtual form and to render a virtual retail display unit. The rendered virtual product assets are dimensionally accurate digital representations of real world products and the rendered virtual retail display unit is a dimensionally accurate digital representation of a real world retail display unit so that the user is allowed to fill the space on the rendered virtual retail display unit with a limited quantity of rendered virtual product assets as in the real world. The user operates the computing device to select one or more rendered virtual product assets to virtually merchandise the rendered retail display fixture. Data associated with the virtual product assets virtually merchandised on the virtual retail display unit are exported into a data file for use in reproducing real merchandising of a real retail display unit in the real world.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION

Figure 1:
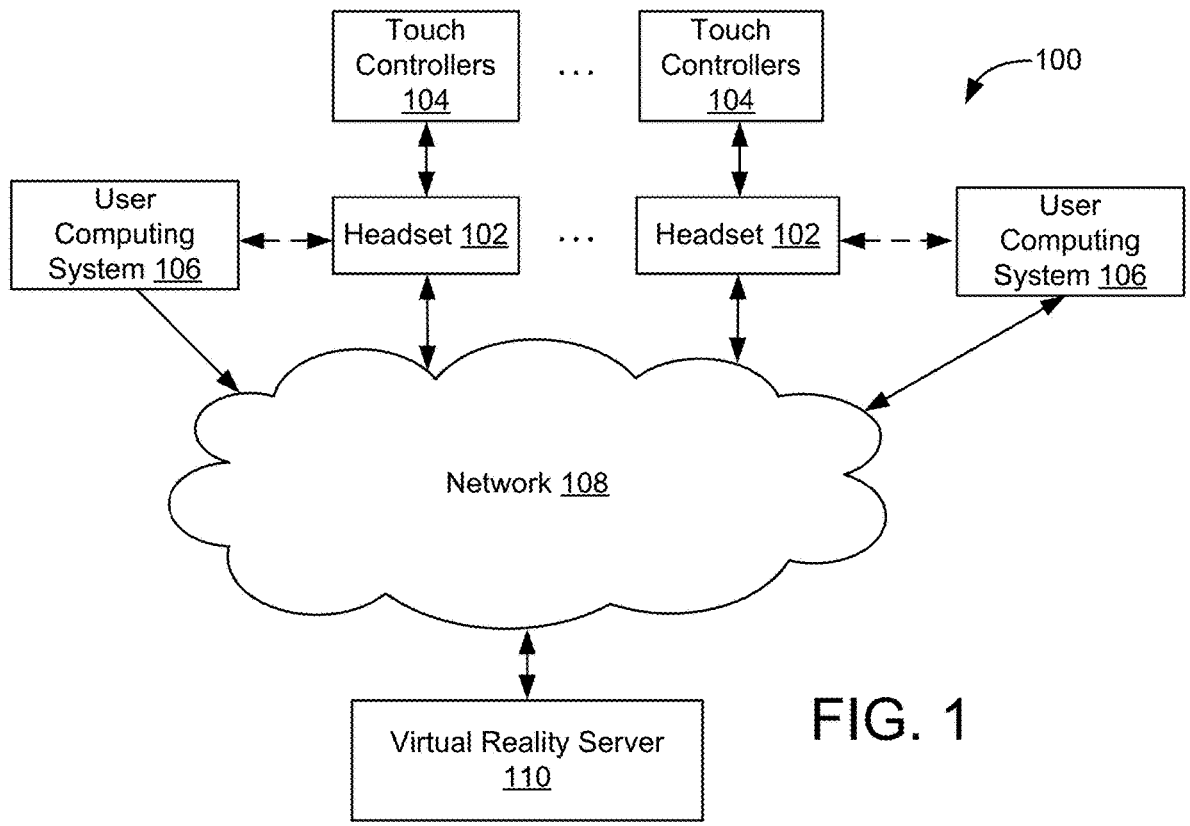
FIG. 1 is a block diagram of a virtual reality (VR) system according to an embodiment.

A virtual reality (VR) system for retail store design uses VR to provide a stimulated experience for collaboratively and individually designing retail stores and store displays. FIG. 1 is a block diagram of a virtual reality (VR) system 100 including a Virtual Reality (VR) server 110 configured to run on a platform or architecture that is accessible by a variety of operating systems (OSs) including, for example, but not limited to Apple branded macOS and iOS, Microsoft branded Windows OS, Google branded Android OS and Chrome OS and various UNIX and LINUX open source OSs. Therefore, multiple users may access VR server 110 regardless of what computing device is being used.

Under one embodiment, VR system 100 includes a plurality of headsets 102 each having a corresponding pair of handheld touch controllers 104 that communicate with their corresponding headset 102 and one or more tracking cameras 105 to access VR server 110. Together each headset 102, pair of touch controllers 104 and tracking cameras 105 are configured to generate and render realistic images, sounds and sensations that simulate a user's physical presence in a virtual reality environment. Tracking cameras 105 are operable to track both headset 102 and the corresponding pair of touch controllers 10. It should be realized that it is possible for tracking cameras 105 to perform hand tracking of a user's physical hands without the need for handheld touch controllers 104.

One exemplary headset 102 and corresponding touch controllers 104 are the Oculus Quest 2 VR headsets and touch controllers created by Oculus, a brand owned by Facebook Technologies, LLC. In addition, each headset 102 of VR system 100 may be capable of running as both a standalone headset with an internal operating system and/or connected with software running on a user computing system 106 over, for example, a USB connection. Headsets 102 and optional user computing system 106 are in communication with a network 108, for example, the Internet, in order to communicate with VR server 110. In addition, user computing system 106 may not be connected to a VR headset and corresponding touch controllers. In such an embodiment user computing system 106 includes controls (such as hand controls or a keyboard) for controlling movement in VR system 100, a display for displaying the virtual world, but without a headset, and a microphone and speaker for providing voice communication.

Figure 2:
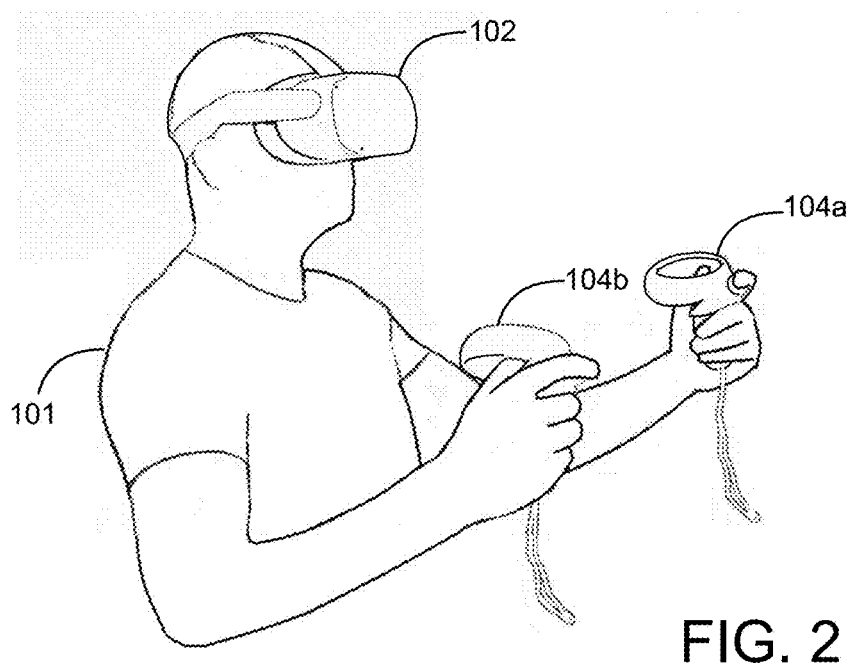
FIG. 2 illustrates a user wearing a VR headset and holding VR touch controllers according to an embodiment.

VR system 100 includes collaborative VR spaces with synchronized media control and user avatars. As illustrated in FIG. 2, before entering the virtual reality, a user 101 may don a headset 102 to be supported by the user's head and the user may grasp or hold touch controllers 104 in each hand. FIG. 2 illustrates user 101 wearing headset 102 and holding left-hand touch controller 104a and right-hand touch controller 104b according to an embodiment. User 101, while wearing headset 102 and holding touch controllers 104a and 104b, is able to look around an artificial world, move in it, and interact with virtual reality features or objects in a meaningful way.

Figure 3:
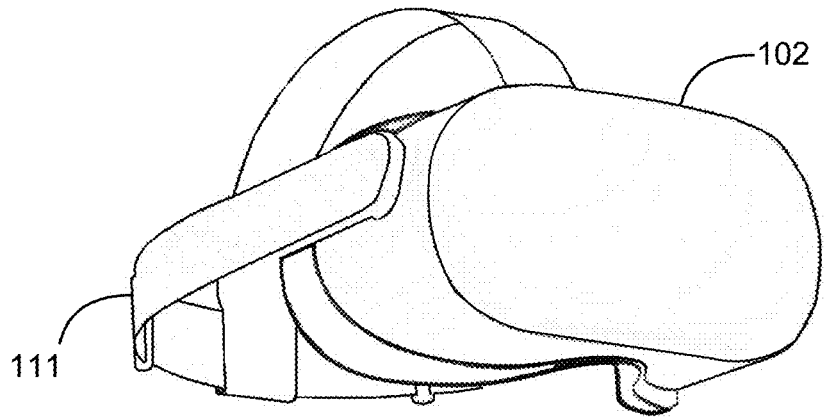
FIG. 3 illustrates a bottom perspective view of the VR headset illustrated in FIG. 2.
Figure 4:
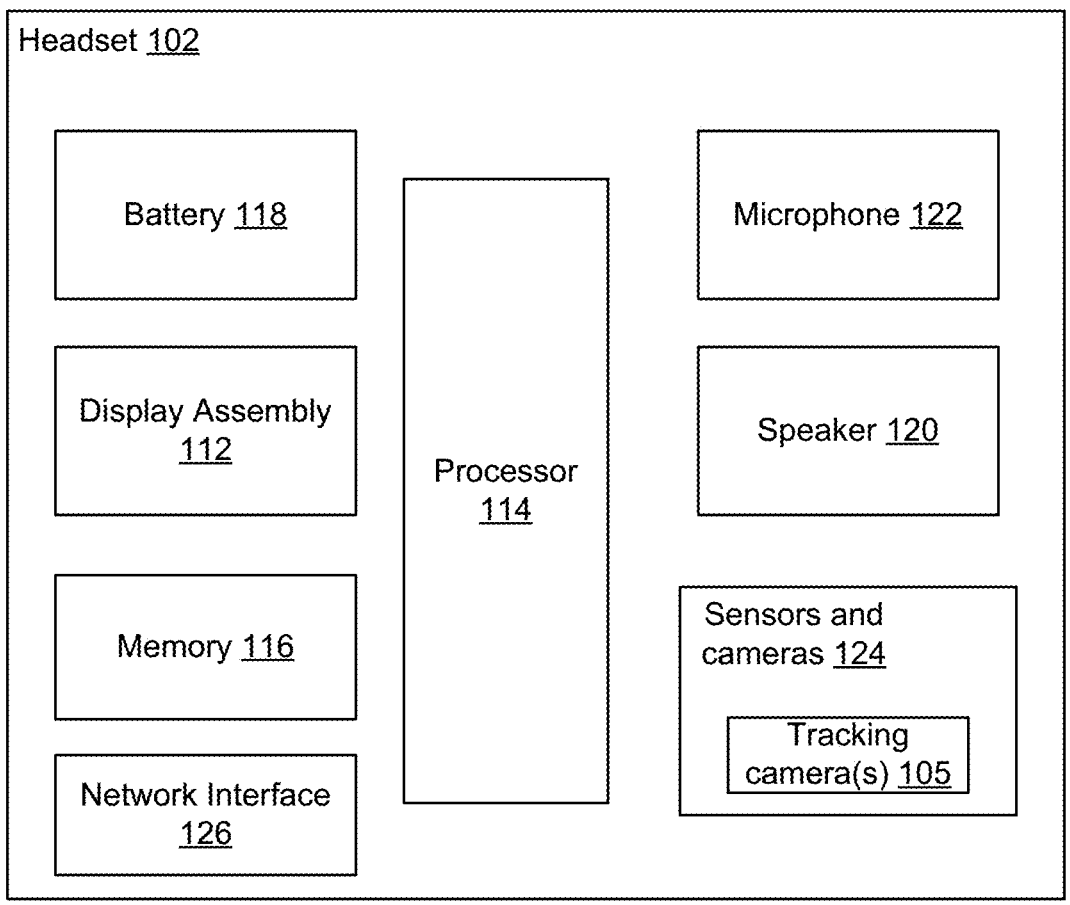
FIG. 4 illustrates a block diagram of VR headset 102 according to an embodiment.

FIG. 3 illustrates a bottom perspective view of headset 102 having a head strap 111. FIG. 4 illustrates a block diagram of headset 102 according to an embodiment. Headset 102 includes a display assembly 112 having lenses configured to render virtual reality images of spaces and objects, a processor 114, memory (both as RAM and storage) 116, a battery 118, integral speakers 120, microphone (s) 122, one or more sensors 124 and a network interface 126 configured to interface with network 108. It should be realized that speakers 120, microphone(s) 122 and one or more sensors 124 may or may not be included in headset 102 and may be separate from headset 102, but each speaker, microphone and sensor is associated with one of the headsets 102 and the user to which the associated headset 102 is worn.

One or more sensors 124 are input devices that sense properties including acceleration and include one or more tracking cameras 105. Regardless of whether sensors and cameras 124 are mounted on headset 102 (as illustrated) or are separate from headset 102, sensors and cameras 124 include one or more tracking cameras 105 associated with each headset 102 and are configured to sense positional tracking, touch controller tracking or hand tracking and may provide pass through viewing, which allows user 101 to temporarily view outside of the virtual reality provided by display assembly 112 and see a real-time view of the environment around user 101.

Figure 5:
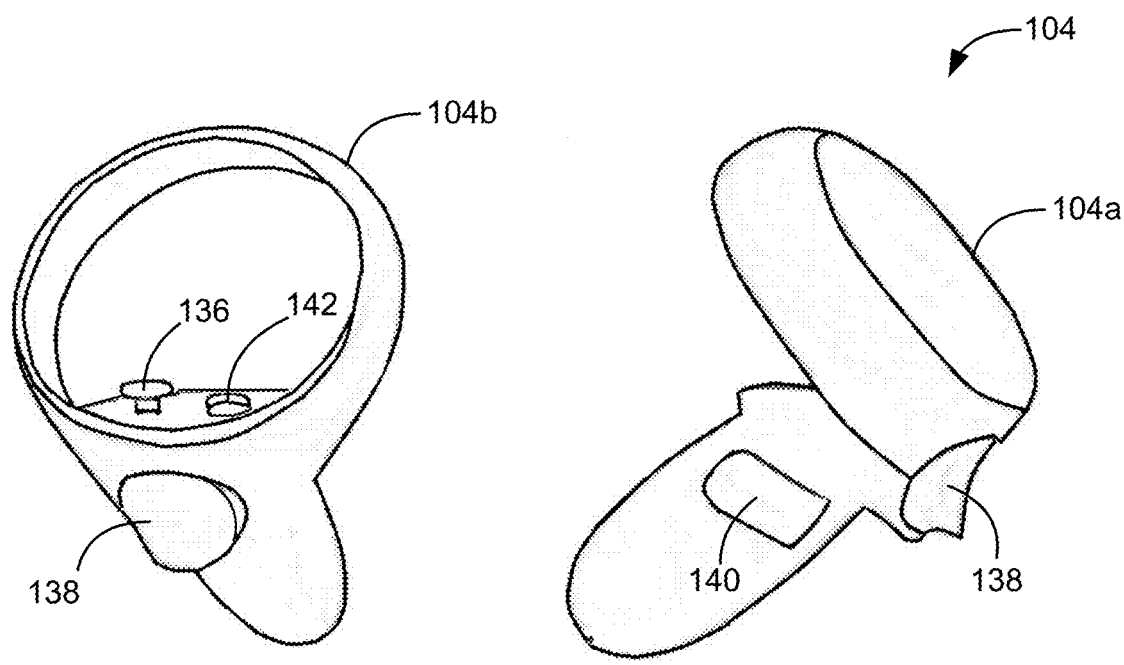
FIG. 5 illustrates a perspective view of a pair of VR touch controllers including a left-hand touch controller and a right-hand touch controller.
Figure 6:
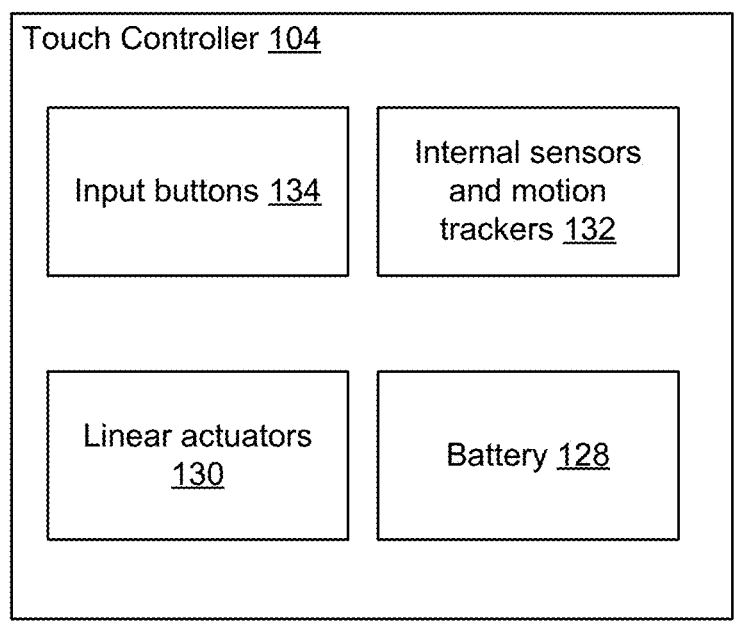
FIG. 6 illustrates a block diagram of one of the pair of VR touch controllers of FIG. 5.

FIG. 5 illustrates a perspective view of pair of touch controllers 104 including left-hand touch controller 104a and right-hand touch controller 104b. FIG. 6 illustrates a block diagram of one of the pair of touch controllers 104. As illustrated in FIGS. 5 and 6, each touch controller 104a and 104b includes an internal battery 128, one or more linear actuators 130 to perform haptic feedback, internal sensors and motion trackers 132 including, for example, infrared LEDs that the one or more tracking cameras 105 on headset 102 use(s) to track touch controllers 104 and input buttons 134 including a thumb stick 136, trigger button 138, grip button 140 and face buttons 142.

Figure 7:
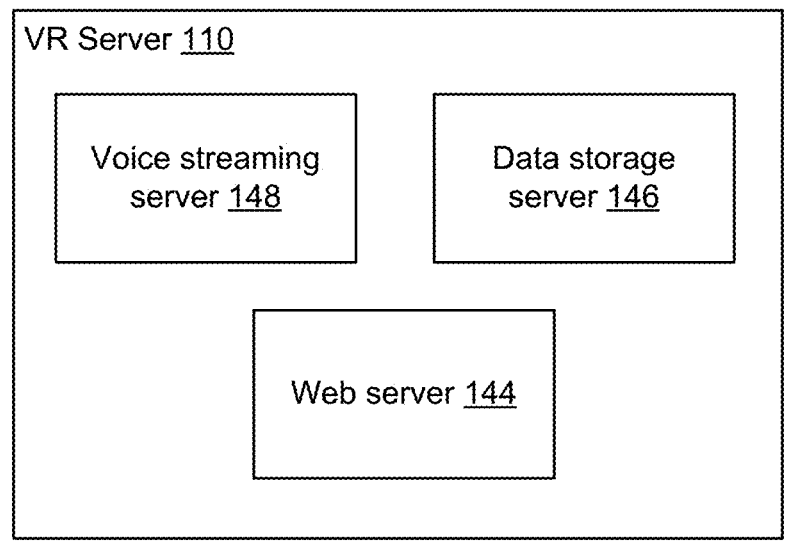
FIG. 7 illustrates a block diagram of a VR server according to an embodiment.

FIG. 7 illustrates a block diagram of VR server 110 according to an embodiment. VR server 110 is configured to deliver content and presentation logic, collect and distribute user events, implement logic and store data. Embedded with VR server 110 is a web server 144, a data storage server 146, and a voice streaming server 148. Web server 144 is configured to allow VR server 110 to communicate with a web client. However, web clients are not the only kind of possible client and other types of communication servers may be used. Data storage server 146 is configured to store data including transient data for data privacy and protection. Voice streaming server 148 is included so that users wearing headsets 102 or speaking into a microphone may communicate via voice with other users in VR system 100 who are wearing headsets 102 or listening to communications via a speaker. In particular, voice streaming server 148 is configured to stream audio data.

Under an embodiment where a user enters the VR system 100 by donning headset 102 and holding touch controllers 104a and 104b in each hand, a distance between the physical real-world floor and the touch controllers 104a and 104b are determined by VR system 100. This determination allows user 101 to enter into the virtual reality of collaborative VR spaces with their user avatar being at their dimensionally correct height with respect to the artificial world. However, it should be realized that the user may enter VR system 100 as their user avatar by way of a different user computing device 106 that includes a display and controls.

Figure 8:
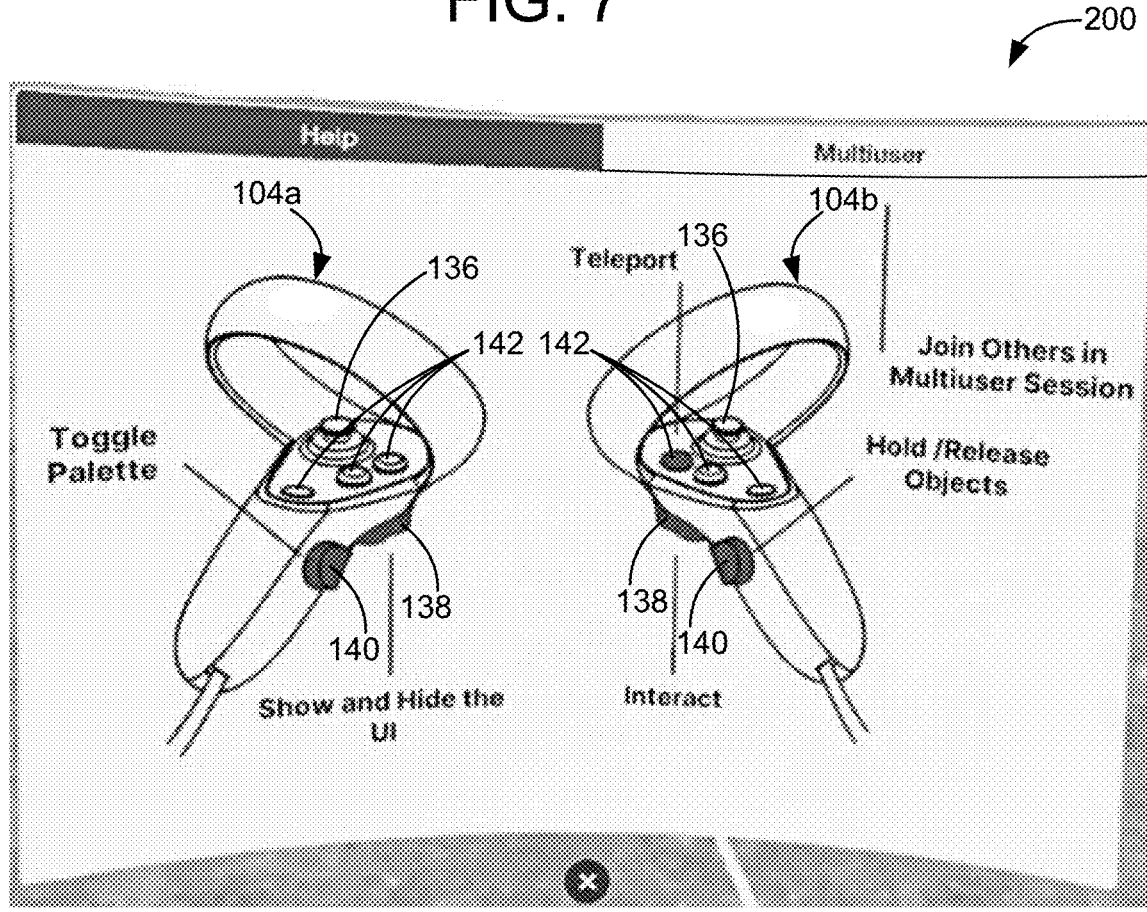
FIG. 8 illustrates a screenshot of a user interface while a user as a user avatar is immersed in the VR system.

FIG. 8 illustrates a screenshot 200 of a user interface (UI) rendered while user 101 is immersed in VR system 100 as their user avatar. The UI of screenshot 200 illustrates the functionality of input buttons 134 including thumb sticks 136, trigger buttons 138, grip buttons 140 and face buttons 142 on hand controllers 104a and 104b under one embodiment. For example, on right-hand touch controller 104b, grip button 140 is configured to allow user 101 to hold and release virtual reality objects and to move objects as needed, trigger button 138 is configured to allow user 101 to interact with or select virtual reality objects and one of the face buttons 142 is configured to allow user 101 to teleport through the collaborative VR spaces. On left-hand touch controller 104a, trigger button 138 is configured to show and hide the UI and grip button 140 is configured to toggle a palette (which will be discussed in detail below).

Figure 9A:
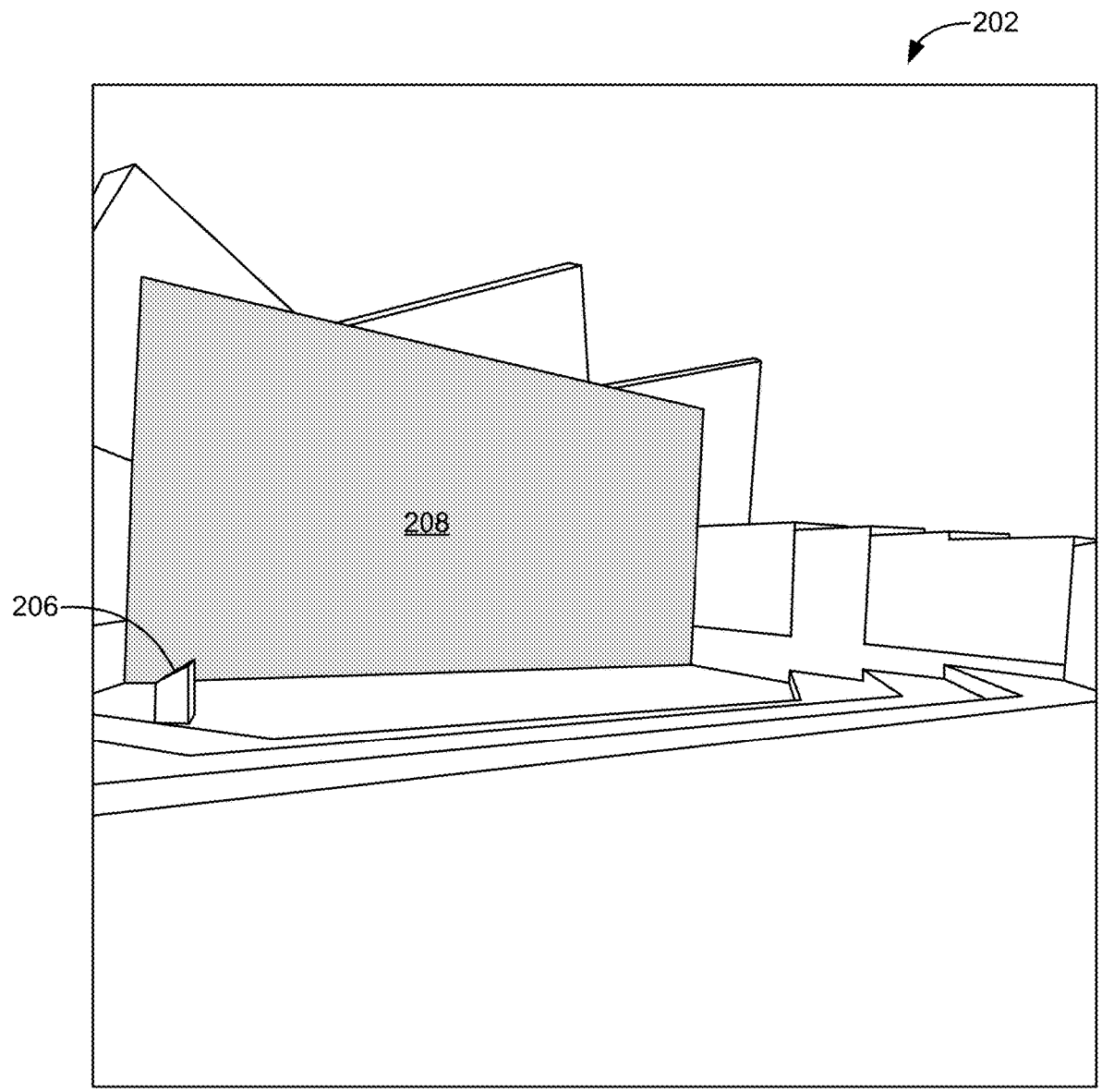
FIGS. 9A-9H illustrate various screenshots of an exemplary collaborative VR space according to one embodiment.
Figure 9B:
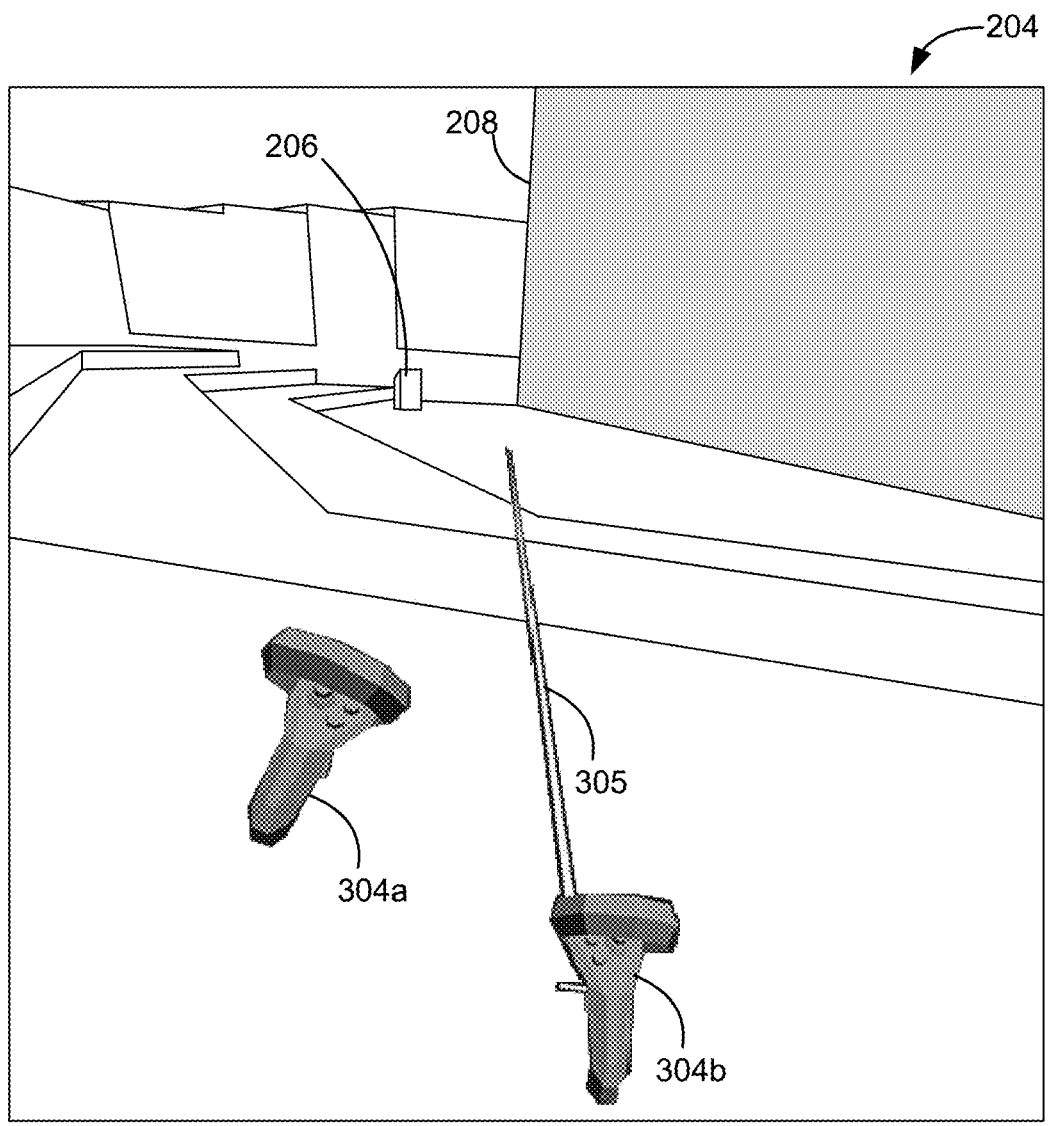

The VR spaces in VR system 100 have interchangeable user-defined virtual environments. For example, by selecting multiuser in the UI illustrated in screenshot 200 of FIG. 8, user 101 (as their user avatar) enters into a virtual environment. In one exemplary collaborative VR space, FIGS. 9A and 9B illustrate screenshots 202 and 204 of a VR theater according to an embodiment. As illustrated in FIG. 9B, the user's avatar is shown as being an invisible body, but with rendered left-hand and right-hand touch controllers 304a and 304b (including a pointer of white light 305 that radiates from right-hand touch controller 304b to hover over selectable objects) and a rendered headset (not illustrated). While a user cannot view their own headset, other user avatars in the collaborative environment are able to view other user avatar touch controllers and headsets and at their proper locations relative to an invisible avatar body. It should be realized, however, that a user's avatar may be a digitally rendered image rather than invisible and with or without their headsets and/or with or without a digital rendering of their hands or touch controllers.

The VR theater allows users to view, as a user avatar, user-based presentations or slides on a virtual display screen 208. Controls may be selected or manipulated to operate features in the VR space, such as to play or stop the presentation being shown on display screen 208. Controls for the presentations on display screen 208 are accessible by the user avatar from a menu or directly accessible on virtual podium 206.

Figure 9C:
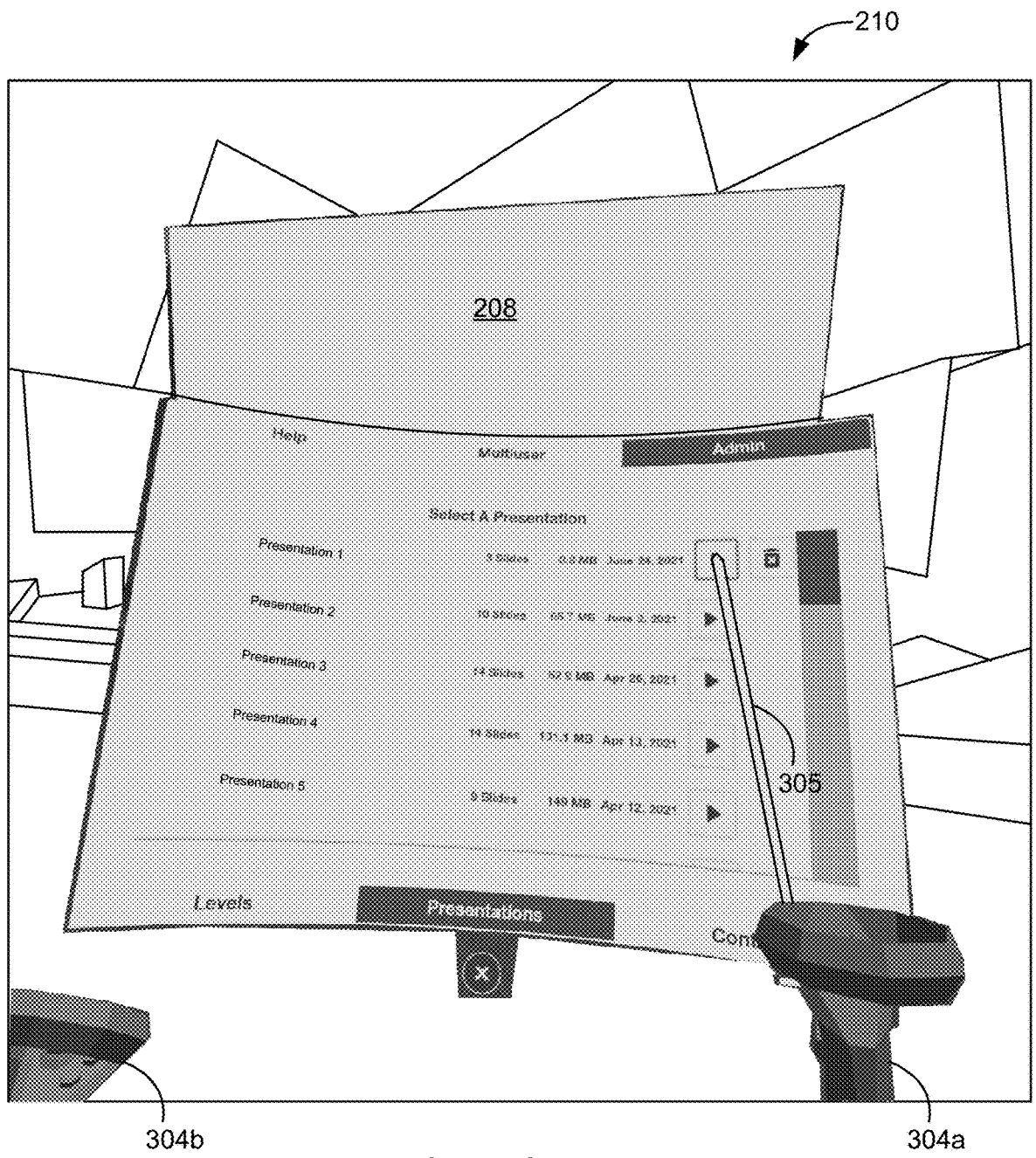
Figure 9D:
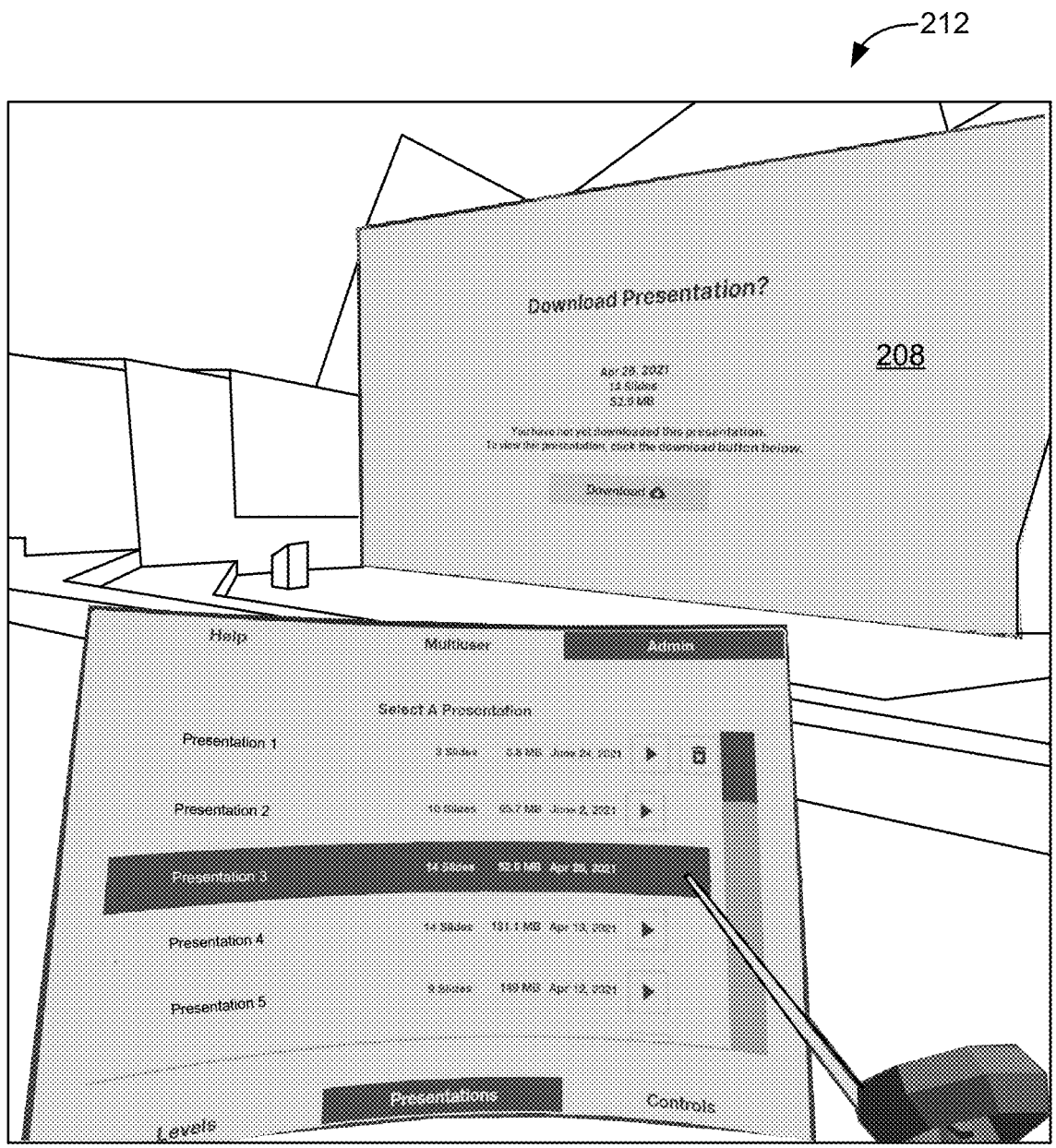
Figure 9E:
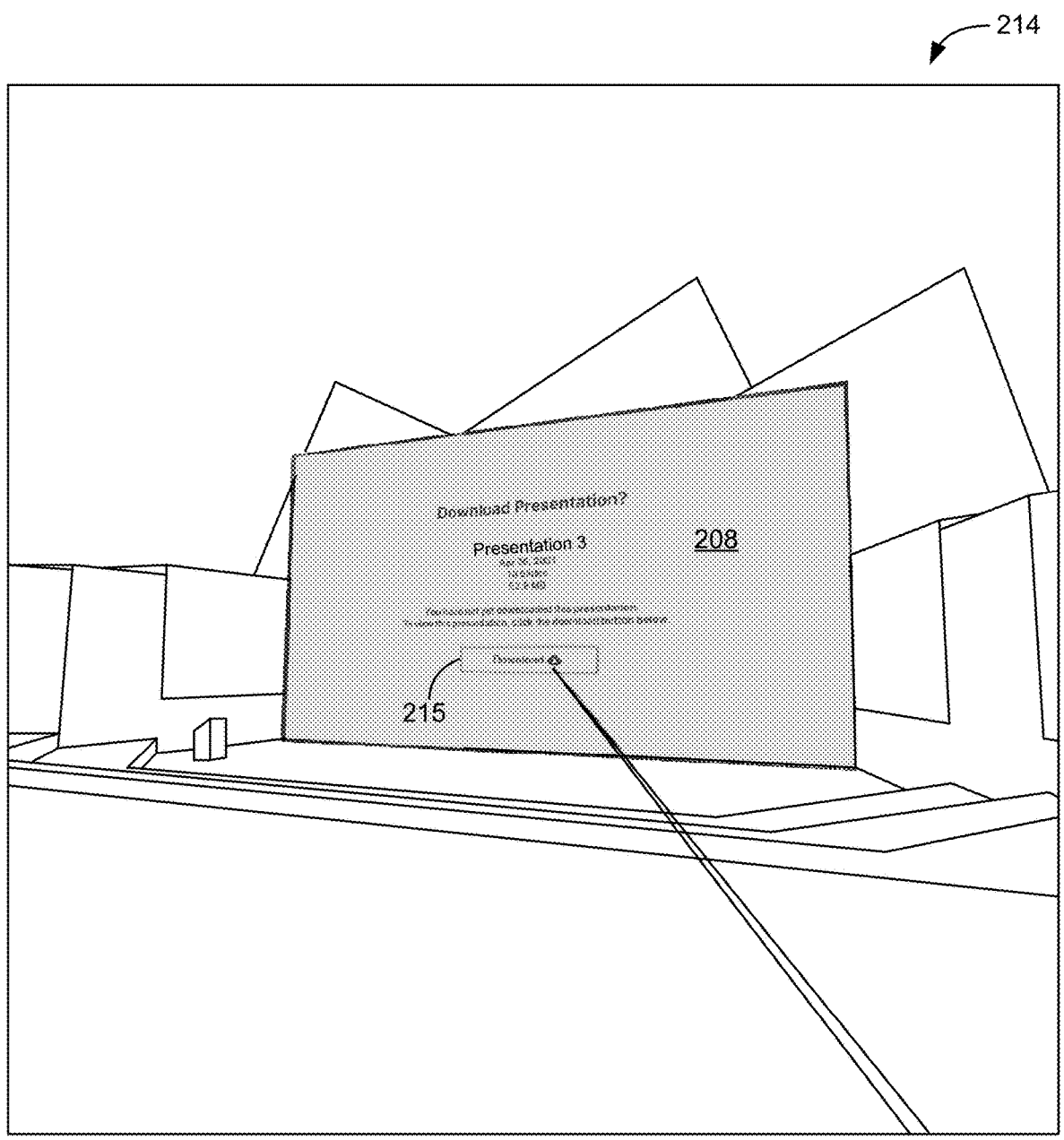
Figure 9F:
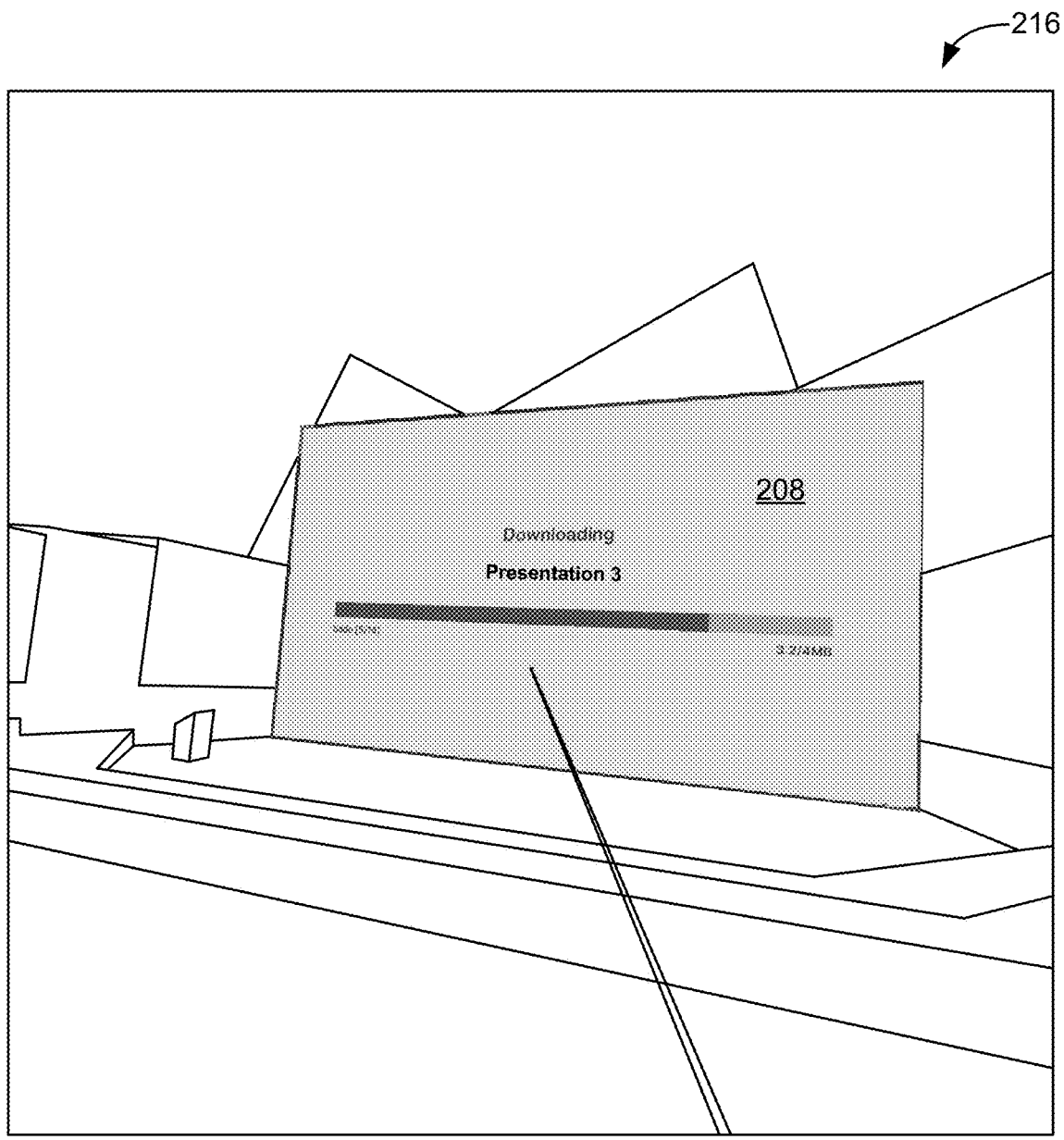
Figure 9G:
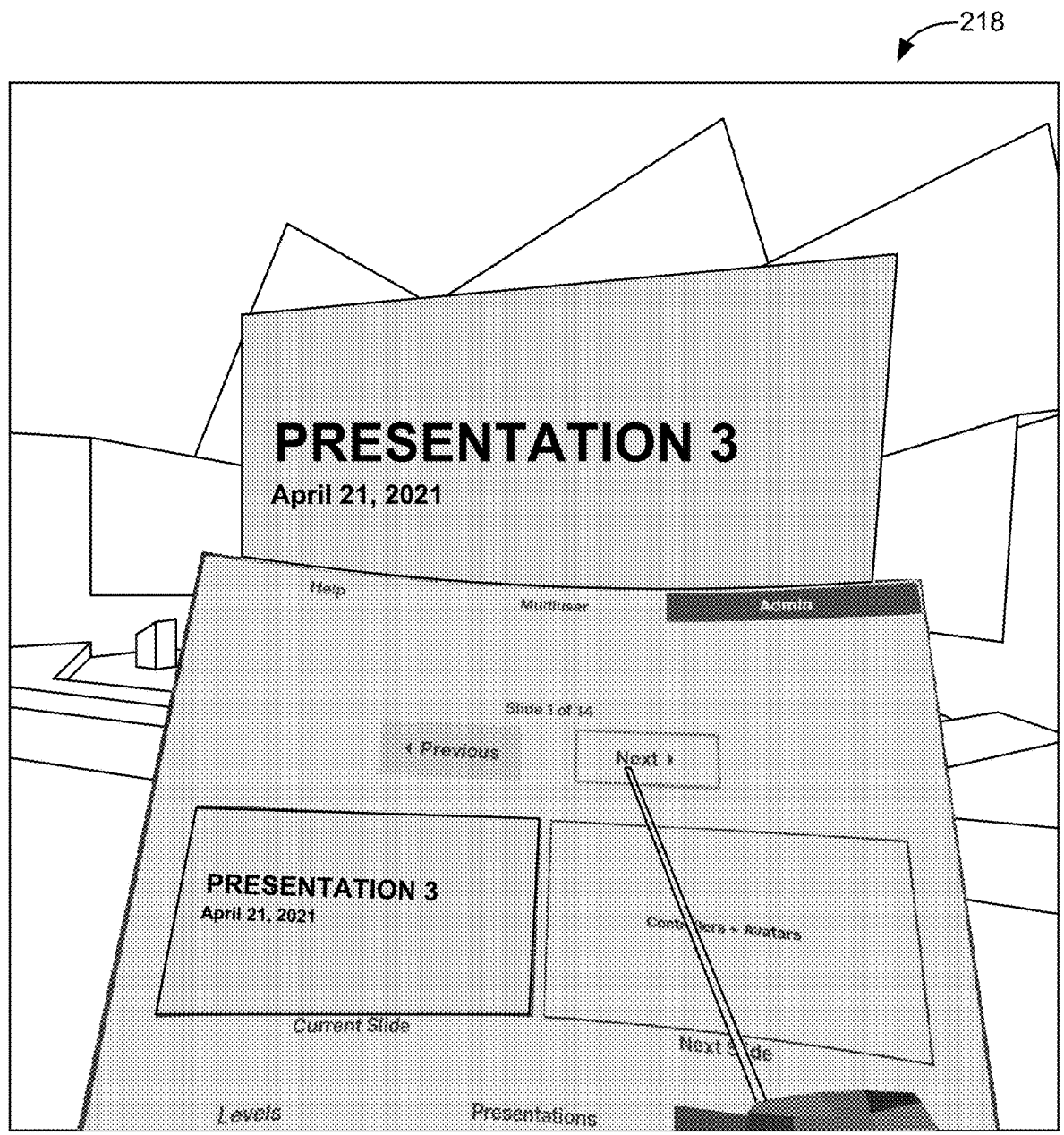
Figure 9H:
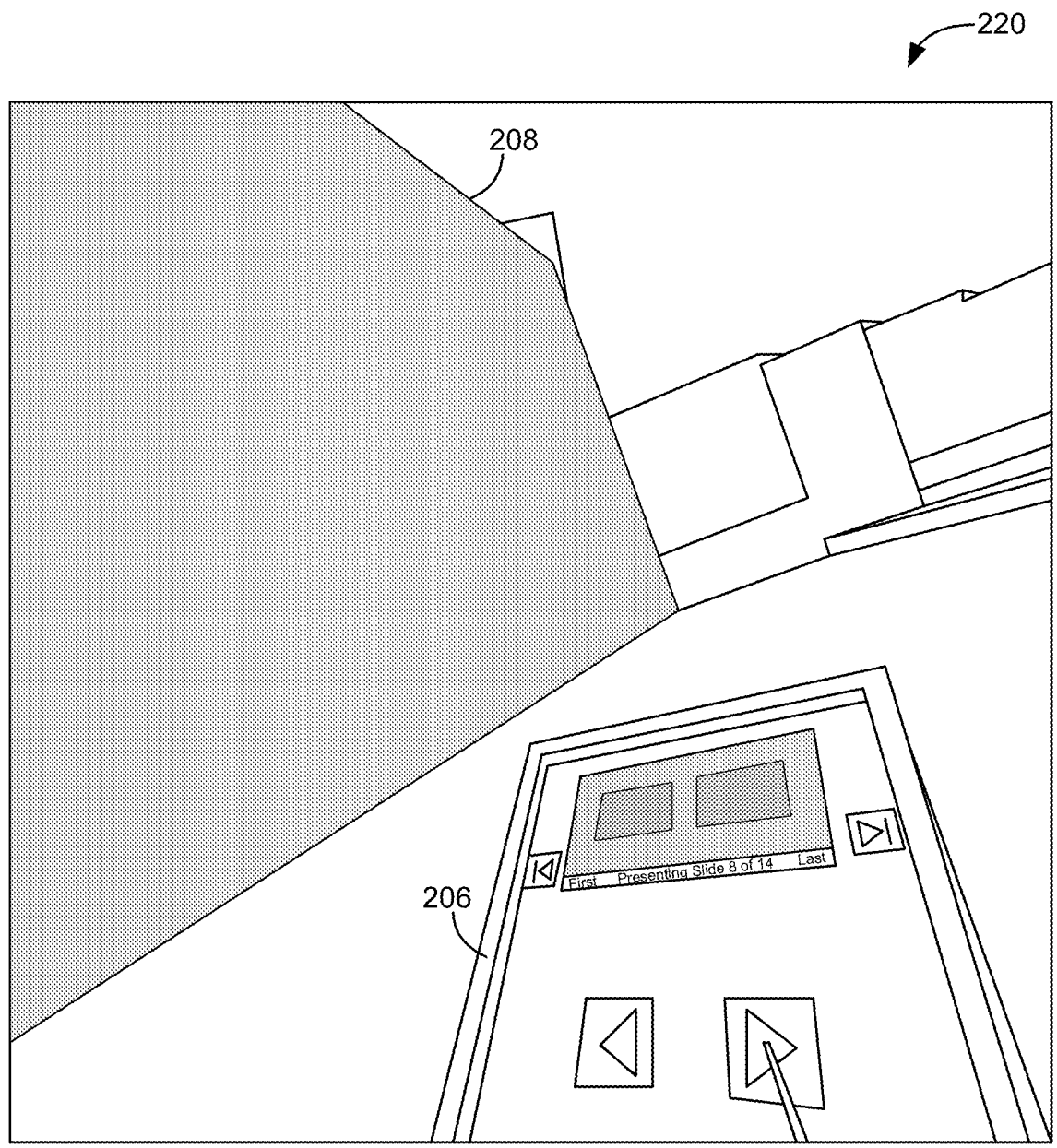

FIG. 9C illustrates a screenshot 210 of the VR theater but with a user interface (UI) rendered in the VR theater while user 101 is immersed in the VR space as their user avatar. The menu includes a list of selectable slide presentations. These slide presentations are stored in data storage server 146 and are accessible to download through VR server 110 by the user avatar making selections using, for example, the radiating white line of light 305 and trigger button 139 on physical right-hand touch controller 104b. FIG. 9D illustrates a screenshot 212 of the VR theater with the UI in FIG. 9C. In FIG. 9D, the user avatar selects Presentation 3 for viewing on display screen 208. FIG. 9E illustrates a screenshot 214 of the VR theater with display screen 208 showing a download button 215. Upon the user avatar selecting download button 215, downloading of the selected presentation begins as illustrated in screenshot 216 of FIG. 9F. In screenshot 218 illustrated in FIG. 9G, the slide presentation is ready to be played. Control of the slide presentation is possible through a control menu as illustrated in FIG. 9G including control of moving from slide-to-slide in the presentation. In the alternative and as illustrated in screenshot 220 in FIG. 9H, the user avatar can teleport to podium 206 and control the slide presentation from control buttons located on the virtual podium.

Figure 10:
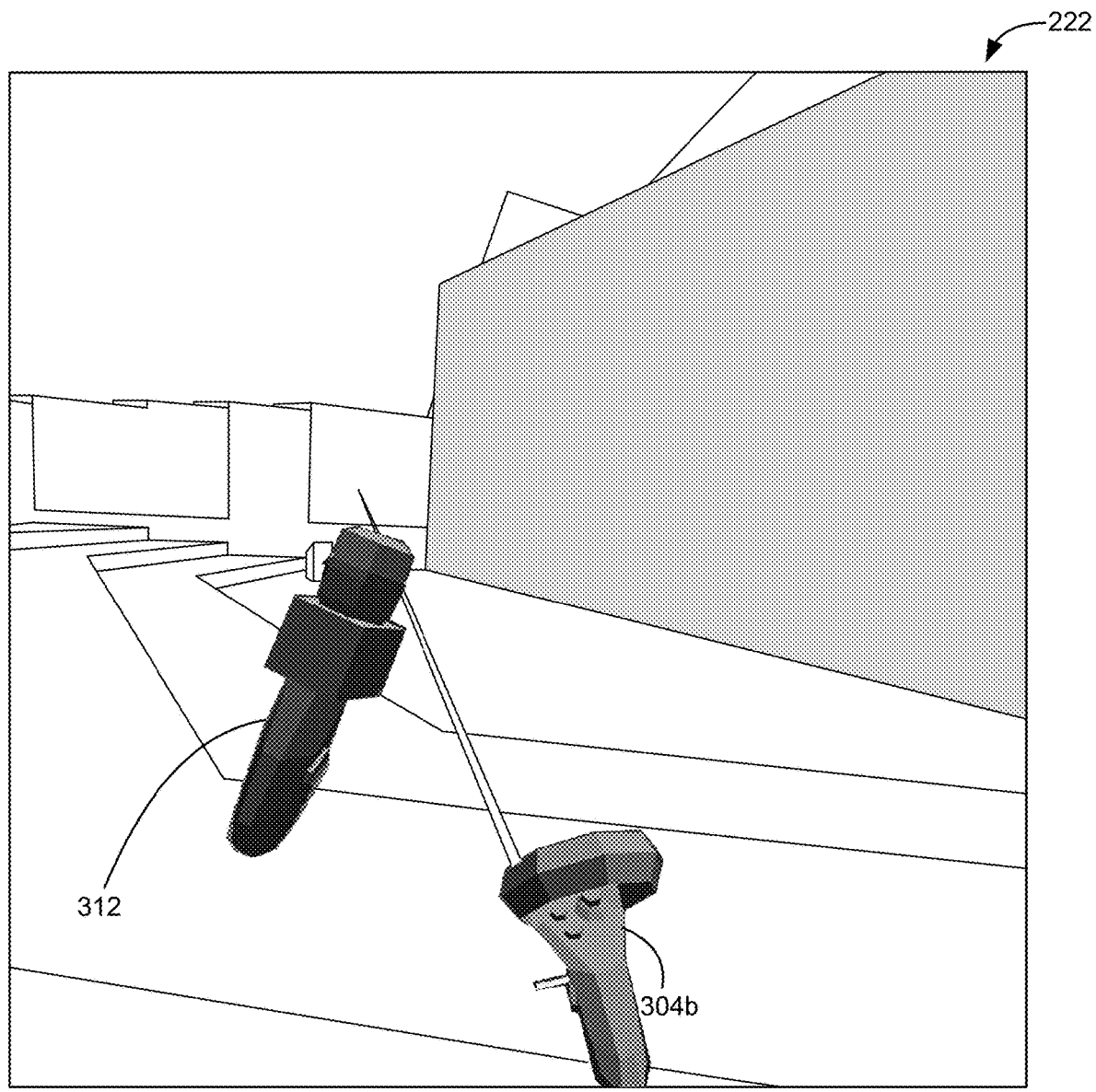
FIG. 10 illustrates a screenshot of the exemplary collaborative VR space in FIGS. 9A-9H with the image of left-hand touch controller changed to be a rendered image of a handheld microphone according to an embodiment.

FIG. 10 illustrates a screenshot 222 of the VR theater showing the functionality of the user being able to communicate with other users in VR system 100 using voice communications. As previously mentioned, VR system 100 includes sensors and cameras 124 including tracking cameras 105 that are configured to sense the position of physical touch controllers 104a and 104b. VR system 100 further includes at least one microphone 122 and at least one speaker 120. The constant streaming of audio in a collaborative VR space may be undesirable because each user 101 is still physically located in the real-world in remote locations from other users. Real-world background noise can interfere, whether that is ambient noise or noise from other people in the real-world location with the user.

As previously discussed, VR server 110 includes voice streaming server 148. Voice streaming server 148 is configured to receive audio data from each microphone 122 in VR system 100 and transmit audio data to each speaker 120 in VR system 100 so as to facilitate voice communications between users in the collaborative VR system 100. In one embodiment, voice streaming server 148 is configured to transmit audio data to each speaker 120 so that each user 101 is capable of hearing all voice communications in the collaborative VR space. However, in this embodiment, not all audio data from microphone 122 is constantly transmitted in the collaborative VR space. To allow the transmission of audio data from microphone 122 to other users in the collaborative VR space, tracking camera 105 detects whether the physical left-hand touch controller 104a (or in the case of hand tracking, a user's left hand) is in a particular position or range of positions relative to tracking camera 105 or headset 102. Upon detection of the particular position or range of positions of the physical left-hand touch controller 104a (or the user's left hand), audio data from microphone 122 is transmitted to other users in the collaborative VR system 100. In one example, camera 105 may detect the physical left-hand touch controller 104a (or the user's left hand) as being within a threshold distance, which activates the transmission of audio data from microphone 122 to other speakers associated with other users or headsets in the collaborative VR system 100. In another example, camera 105 may detect the physical left-hand touch controller 104a (or the user's left hand) as being in a threshold positional orientation, which activates the transmission of audio data from microphone 122 to other speakers associated with other users or headsets in the collaborative VR system 100. Certain threshold positional orientations may include the physical touch controller being held upwards or the user's hand being squeezed into a fist and positioned upright as if pretending the hand is a microphone. It should be understood that activating the transmission of audio data based on other touch controllers, such as the physical right-hand touch controller 104b, or a right hand is possible.

As illustrated in FIG. 10, the physical left-hand touch controller 104a is within either a threshold distance of sensors and cameras 124 or within a threshold positional orientation of sensors and cameras 124 to activate the transmission of audio data from microphone 122. User 101 is alerted to the activation of transmissible audio data when the user avatar is changed from having a rendered image of left-hand touch controller 304b to a rendered image of a handheld microphone 312. In other words, in FIG. 9B, an image of left-hand touch controller 304b is rendered and therefore audio is not being transmitted from microphone 122 to other speakers associated with other users or headsets in the collaborative VR system 100, but in FIG. 10 an image of a handheld microphone 312 is rendered and therefore audio is being transmitted from microphone 122 to other speakers associated with other users or headsets in the collaborative VR system 100.

Figure 11:
FIG. 11 illustrates a screenshot of the outside of an exemplary collaborative VR space according to an embodiment.

FIG. 11 illustrates a screenshot 224 of another exemplary collaborative VR design space—a VR retail store. The VR retail store may be virtually built out or under a virtual design and build. Regardless, the VR retail store is or will be complete with floors, walls, ceiling and retail display fixtures that form aisles and may or may not be stocked with virtual merchandise. In the VR retail store, not only can a user experience the environment, but users may be able to swap different layout features and fixtures, move features and fixtures, delete and insert features and fixtures within the virtual space to view how different combinations of features or fixtures may appear when the retail space is actualized in the real world.

In the VR retail store design space, users as user avatars can work independently or collaboratively to design a space or spaces in a retail store. In this simulative environment, there may be open space and floor to work on new store designs. A user may access a menu of virtual retail display fixtures and features to add or insert into their open space. Once added, the user can select and manipulate the fixture by moving it around in any direction and turning it from 0 to 360 degrees. As soon as the user deselects, other users in the VR environment may select the object and manipulate it. Therefore, a feature created by one user may be manipulated by other users in the virtual environment.

In the VR retail store design space, it is possible that a user may select an item to be added to a store design that is unavailable. This can occur if the user violates a standard design rule, such as, for example, aisle spacing and physical boundary rules and etc. The user can add other fixtures or features from menu items as the design develops. After the collaborative users have finished the design or are taking a break from their still unfinished design, the design may be exported. The data may be exported into CAD drawings or 2D plan views as well as 3D models including exported into augmented reality files. While in the virtual design room, different design areas having design features can be simplified for purposes of image rendering. For example, a first area of the design room may have an area that is in the midst of being designed and a second area in the design room is in process of holding a design that is not fully rendered. The features built in the second area are simplified to basic boxes for purposes of image rendering because the first area is not the subject of the current designing. This helps keep the headset optimized for virtual reality of the subject design.

Figure 12A:
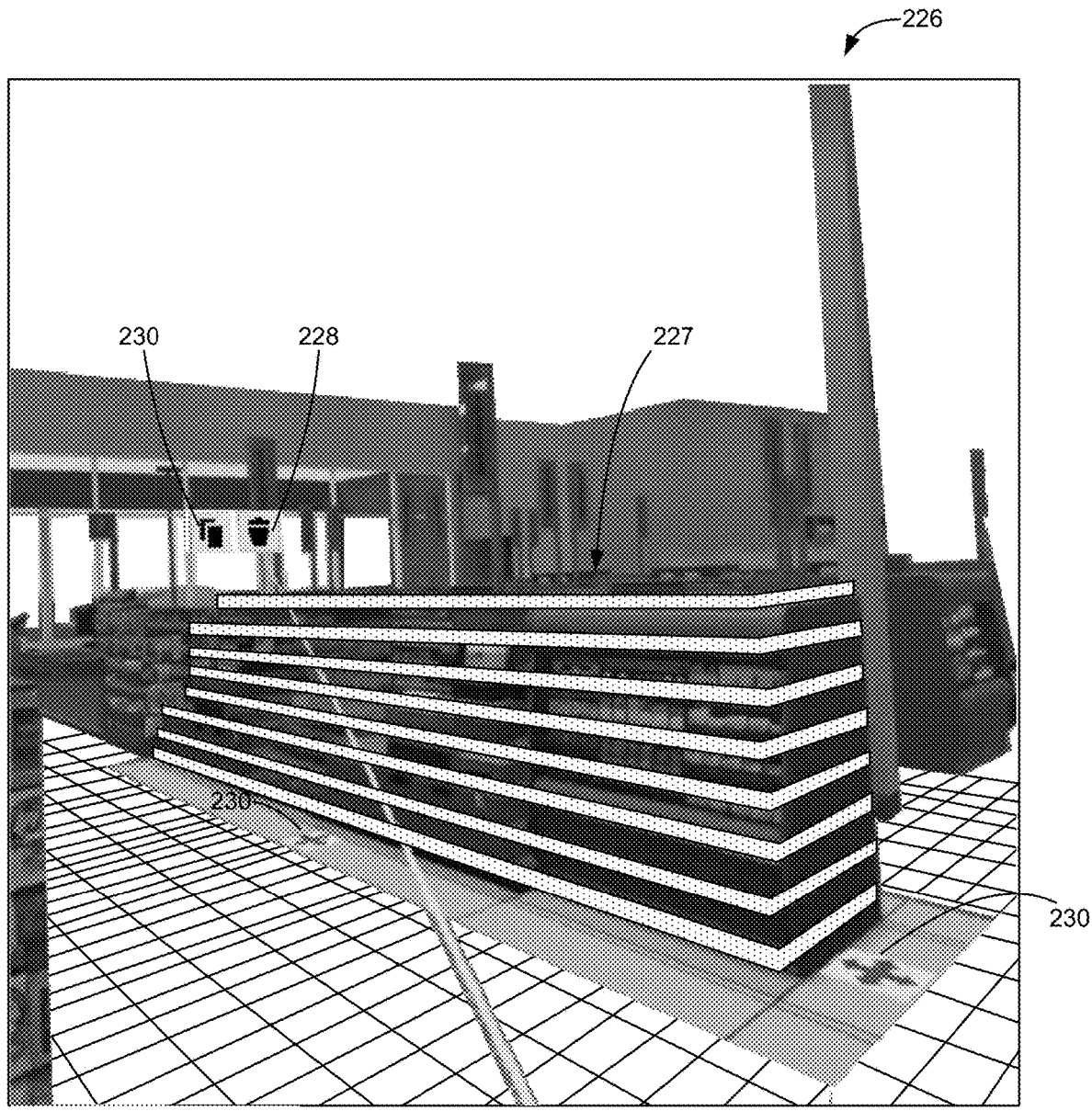
FIGS. 12A-12G illustrate various screenshots of the inside of an exemplary collaborative VR space according to an embodiment.
Figure 12B:
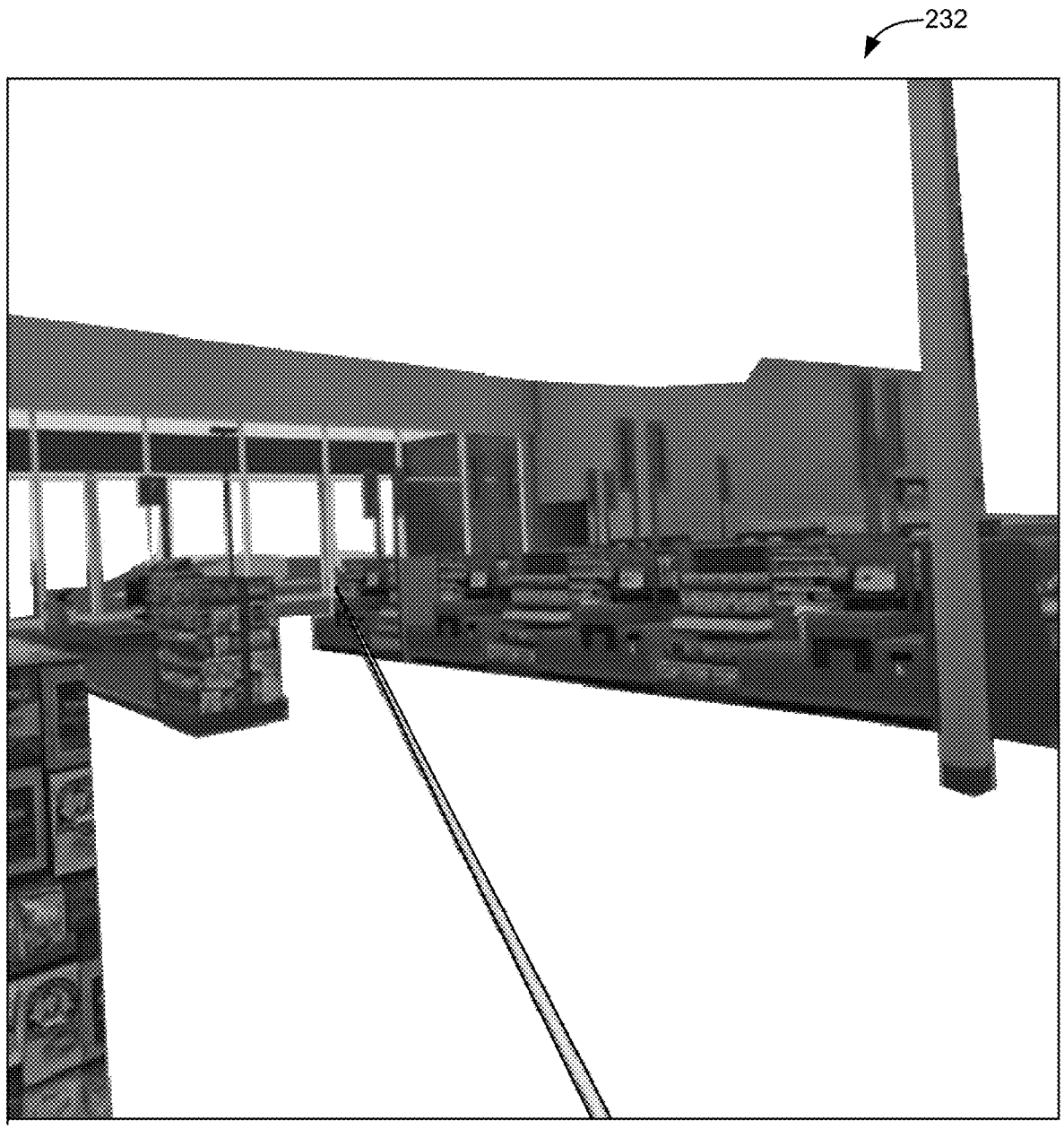
Figure 12C:
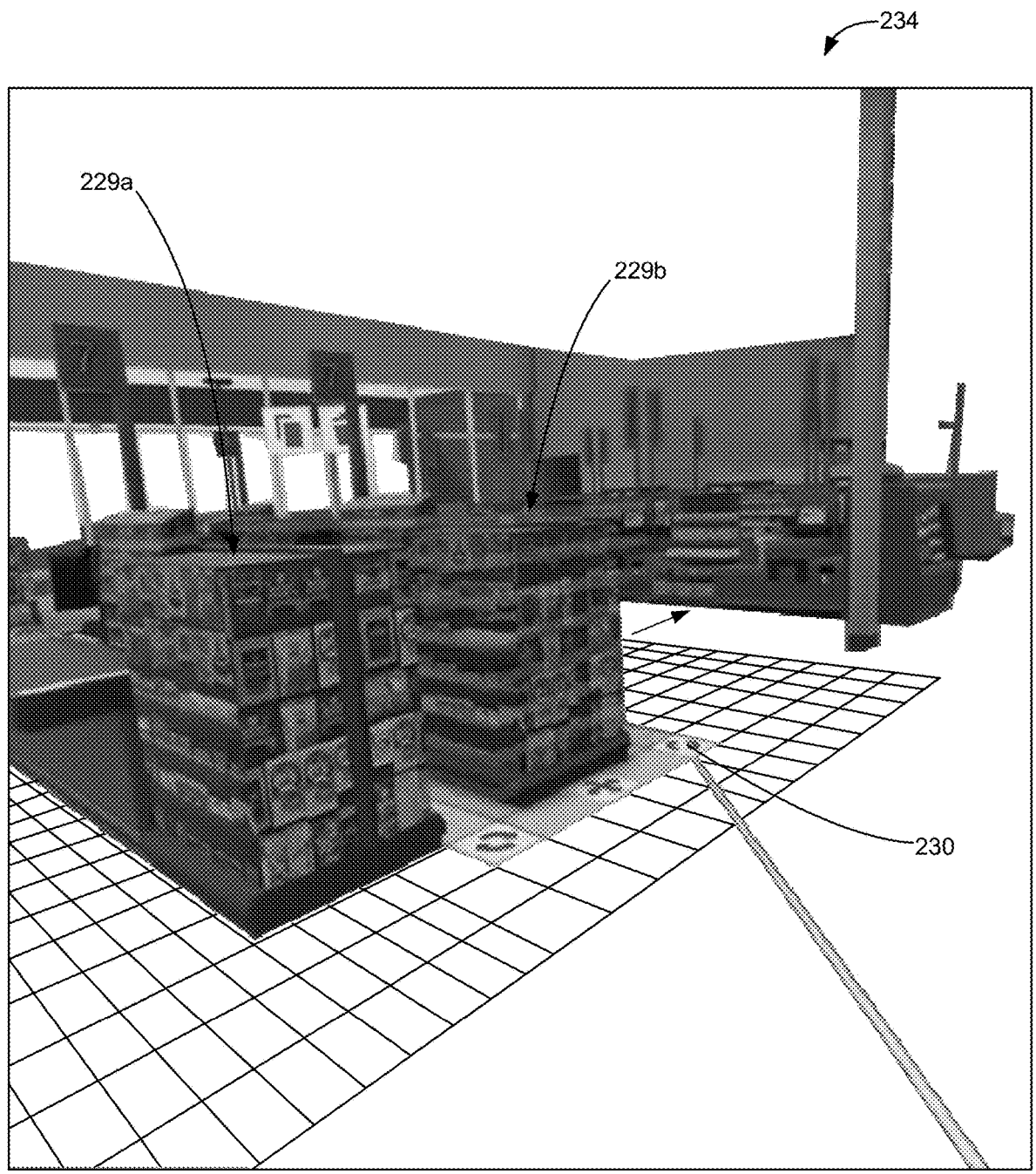

FIG. 12A illustrates a screenshot 226 of the exemplary VR retail store space shown in FIG. 11, but with the user avatar located inside the VR retail store space rather than outside of the VR retail store space. In FIG. 12A the user avatar has selected one or more fixtures 227 for editing. Upon selection, not only is the one or more fixtures 227 that were selected shown with a plurality of horizontal stripes around them (illustrated with a representative fill in FIG. 12A), but the floor of the VR retail store space appears with a grid and the gridded floor around the one more fixtures is highlighted in a light gray-scale hue. The grid illustrates a distance between objects or fixture on the virtual floor. In the embodiment illustrated, each grid block represents a foot of space. In addition, upon selection, control buttons appear adjacent to the selected one or more fixtures 227. In particular, a delete control button 228 is rendered, a duplicate control button 230 is rendered, and move control buttons 230 are rendered on the grid floor. In this illustration, the user avatar has selected the one or more fixtures to delete them. FIG. 12B illustrates a screenshot 232 with one or more fixtures 227 deleted from the VR space after the delete control button 228 was selected. FIG. 12C illustrates a screenshot 234 with one or more fixtures 229a having been duplicated and then the duplicated fixture 229b being moved or dragged in the direction of the illustrated arrow using move control button 230 into the position of where one or more fixtures 227 was deleted.

When moving or dragging a fixture in the VR retail store space, there is a fast move or drag where the fixture moves in one grid block increments or in what would be one-foot increments. In addition, there is a slow move or drag where the fixtures moves in smaller increments than one block increments or what would be one-inch increments. The speed of movement (fast or slow) is determined by tracking camera(s) 105 in headset 102 detecting the speed of movement of the touch controller being used to direct the movement of the object.

Figure 12D:
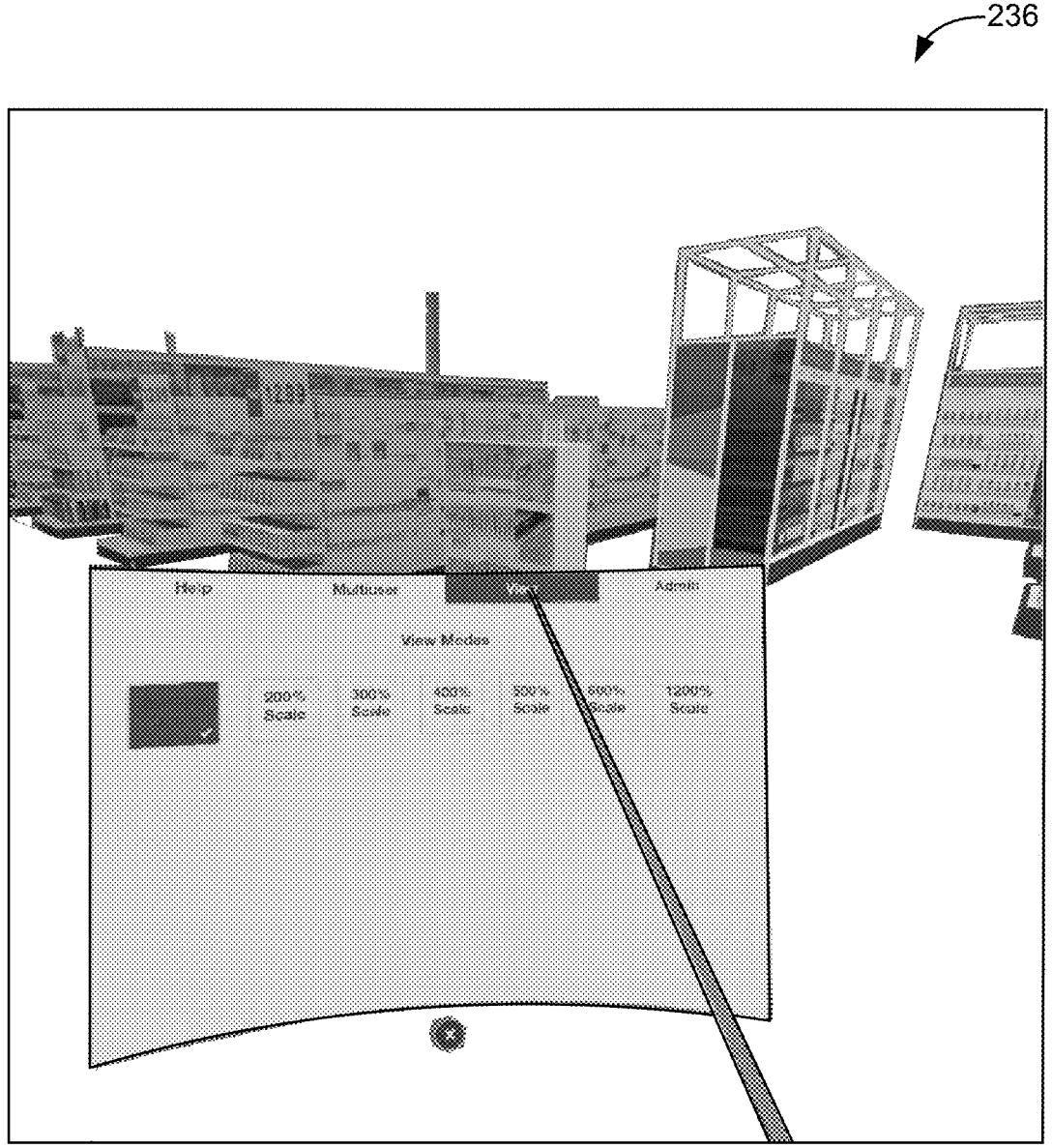
Figure 12E:
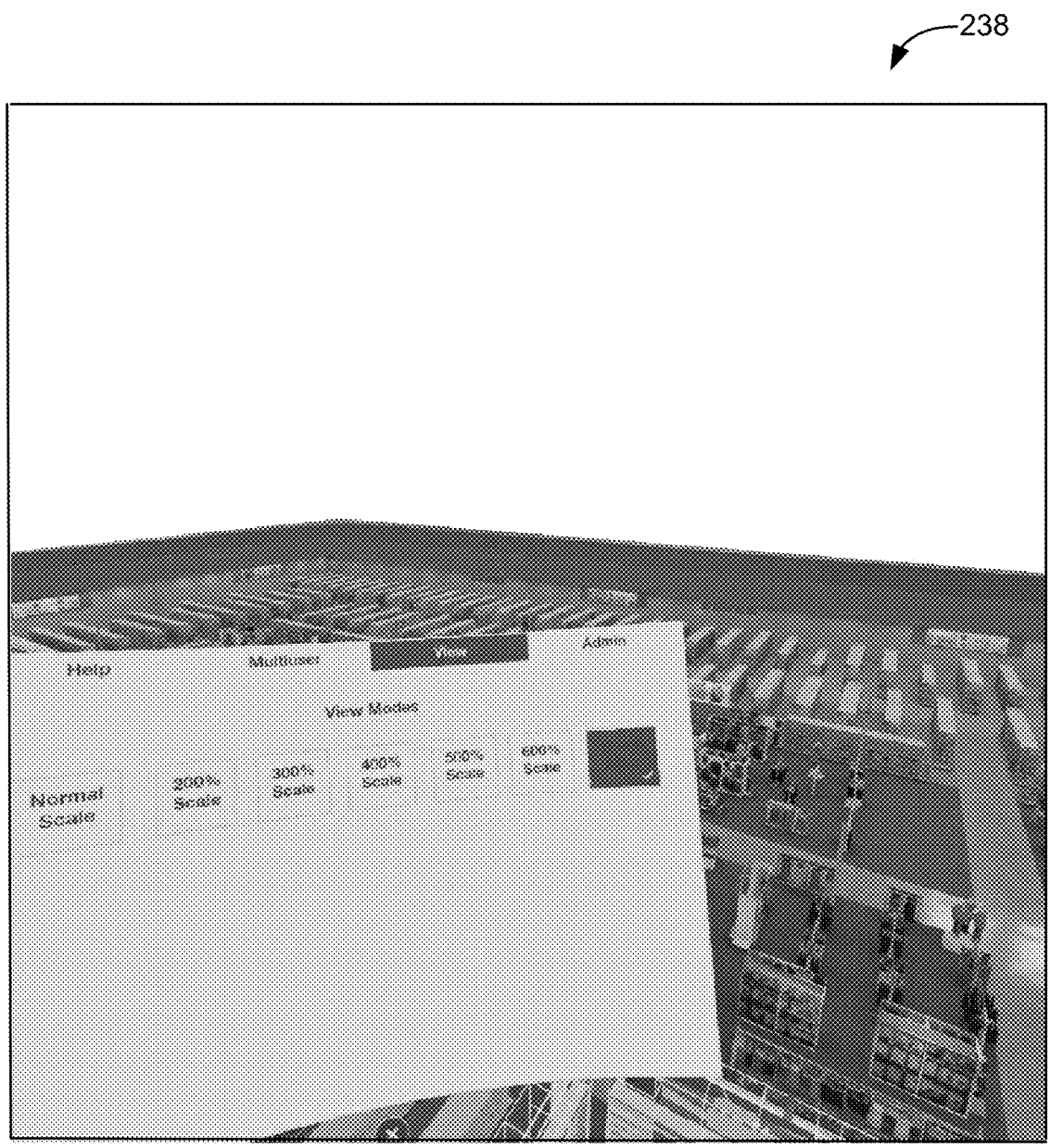
Figure 12F:
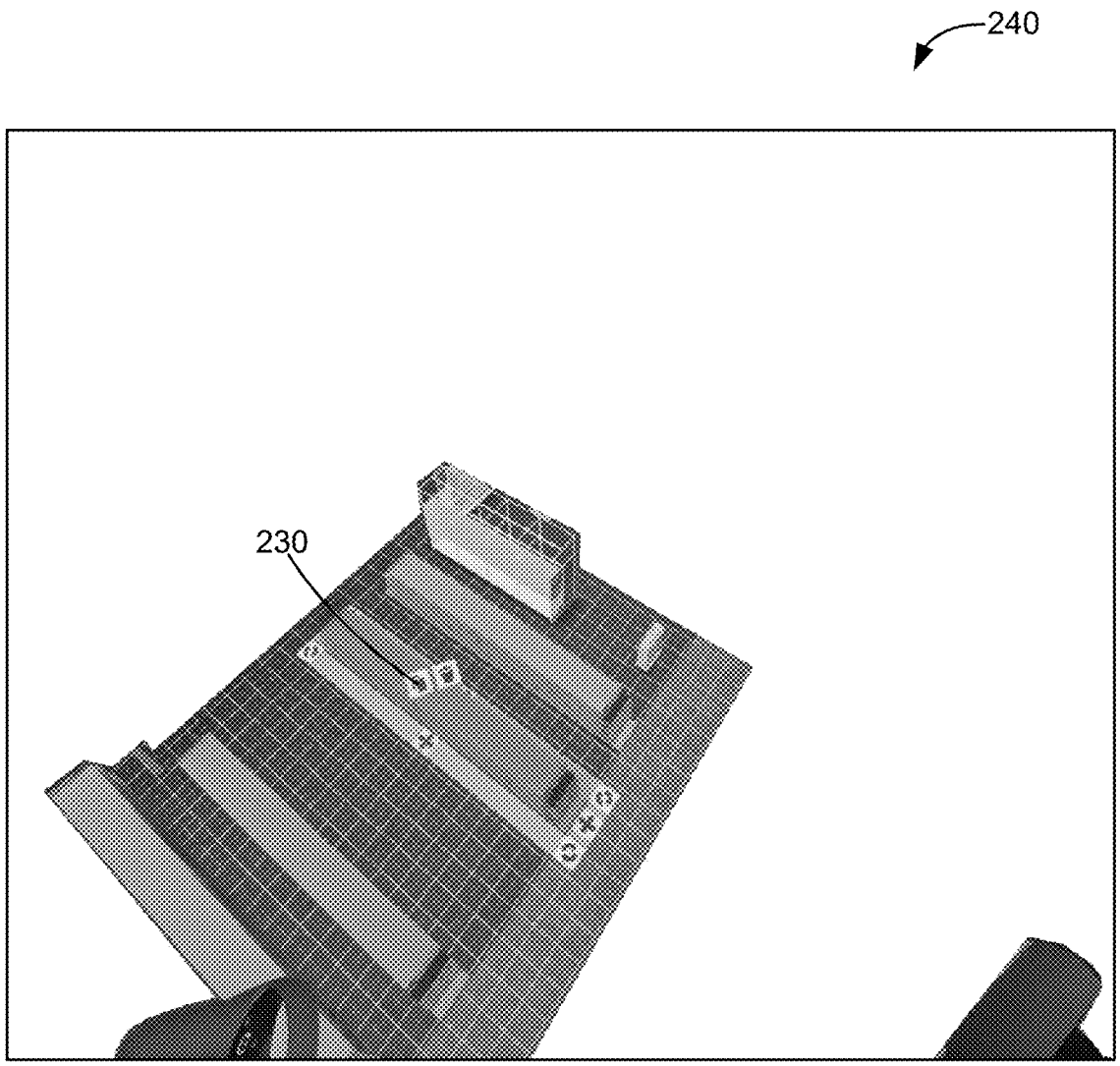
Figure 12G:
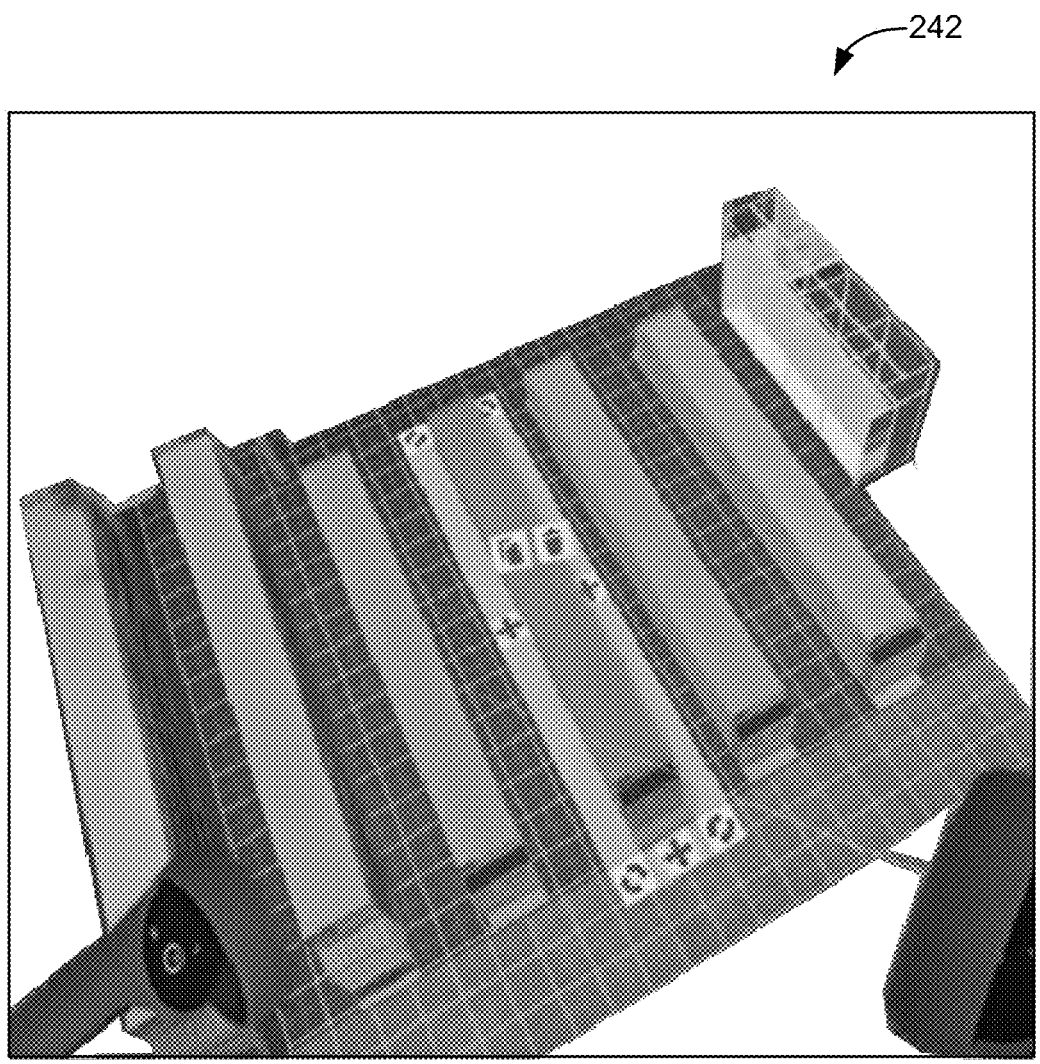

Besides retail display fixtures being deleted, duplicated, inserted, moved or swapped, other features and objects may be manipulated. For example, the ceiling types may be swapped out. This gives users a sense of a drop-down ceiling versus an open ceiling or other types. In-store marketing signs (ISM) may also be swapped out in real-time to give users a sense of which signage would be most effective. The users may view the virtual space from the floor level as illustrated in FIGS. 12A-12C or the user may view the VR space from a bird's-eye or top-down view. FIG. 12D illustrates a screenshot 236 of a user interface (UI) rendered in the VR retail store space while user 101 is immersed as their user avatar. The menu on the UI includes a list of selectable view modes or scales at which the user may view the bird's eye or top down view. FIG. 12E illustrates a screenshot 238 showing the selection of 1200% scale from the UI in FIG. 12D. Behind the UI, illustrates the resulting view of selected scale of the VR retail store. Each user in the VR space may simultaneously have a different view of the VR space including viewing other user avatars in their selected virtually scaled positions in the virtual environment. FIGS. 12F and 12G illustrates a screenshot 240 and 242 showing the duplication of and movement of features or objects in the VR space while the user is viewing the environment at a scaled view. As illustrated, the gridded floor in the light gray-scale hue appears upon selection of a display fixture. In particular, one or more fixtures are duplicated using duplicate control button 230 and the duplicated fixture is moved into a position.

Figure 13:
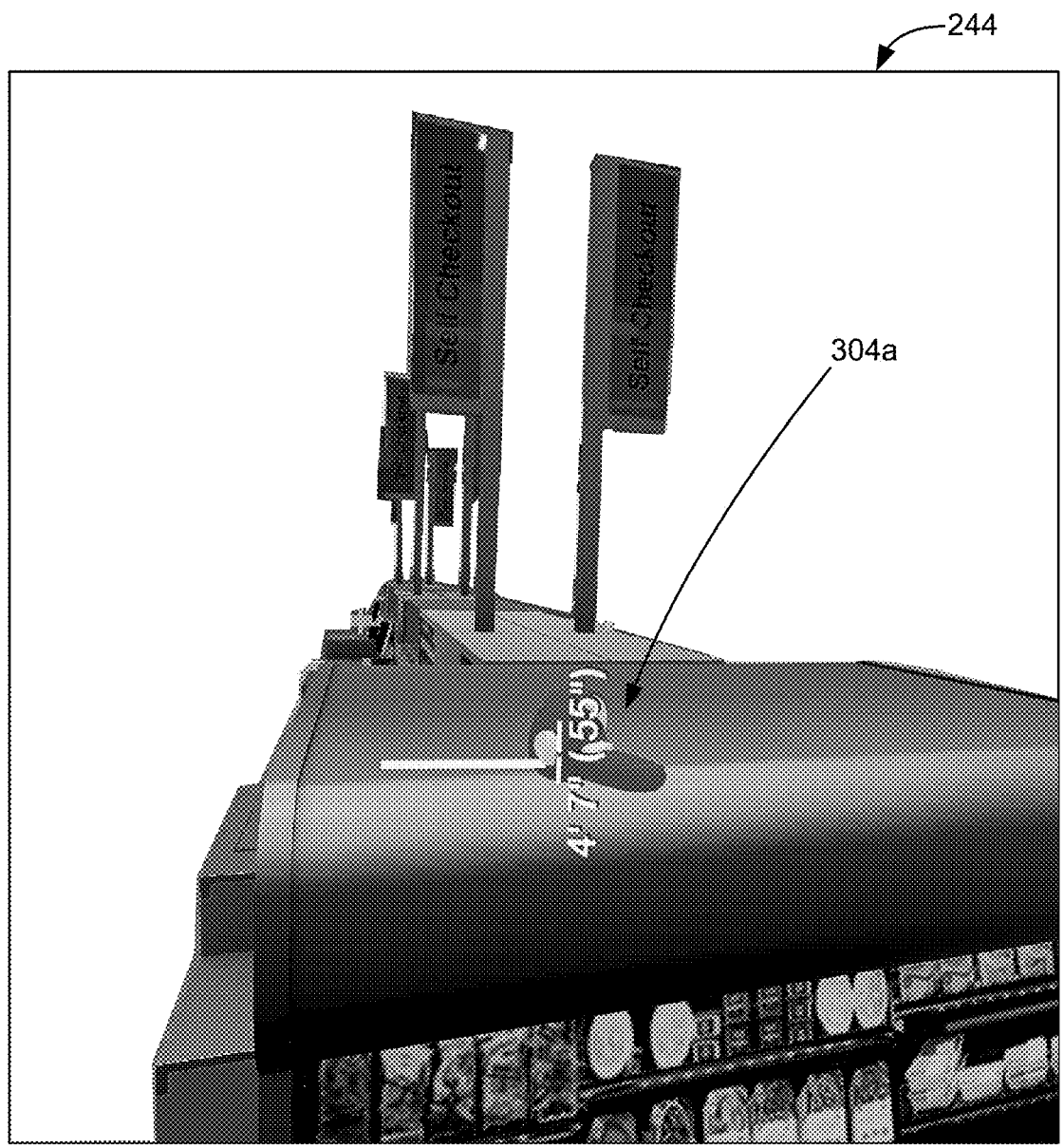
FIG. 13 illustrates a screenshot of the inside of the exemplary collaborative VR space in FIG. 12 with a measurement tool.

FIG. 13 illustrates a screenshot 244 of the exemplary VR retail store space shown in FIGS. 12A-12G. In one embodiment, VR system 100 also includes a measurement tool. Within a VR space, user 101 can also use one of the touch controllers, such as the physical right-hand touch controller 104b, to hover the rendered right-hand touch controller 304b adjacent to features and fixtures to measure dimensions of the space and fixtures within the virtual space. For example, upon tracking camera 105 sensing user 101 turning over one of their wrists and therefore the physical touch controller, for example, turning over right-handed wrist and inverting the physical right-hand touch controller 104b. As illustrated in FIGS. 10-12, user 101 understands that right-hand touch controller 104b includes the measurement tool because the rendered right-hand touch controller 304b also renders a level ruler on the bottom side of the rendered image of right-hand touch controller 304b. Tracking camera 105 senses the physical inversion of right-hand touch controller 104b and communicates the inverted positional orientation to VR server 110. In response, VR server 110 renders a dimension at or near the rendered level ruler. In this embodiment, the rendered dimension is a height measurement between the rendered level ruler on the touch controller and the rendered floor of the VR space.

Figure 14:
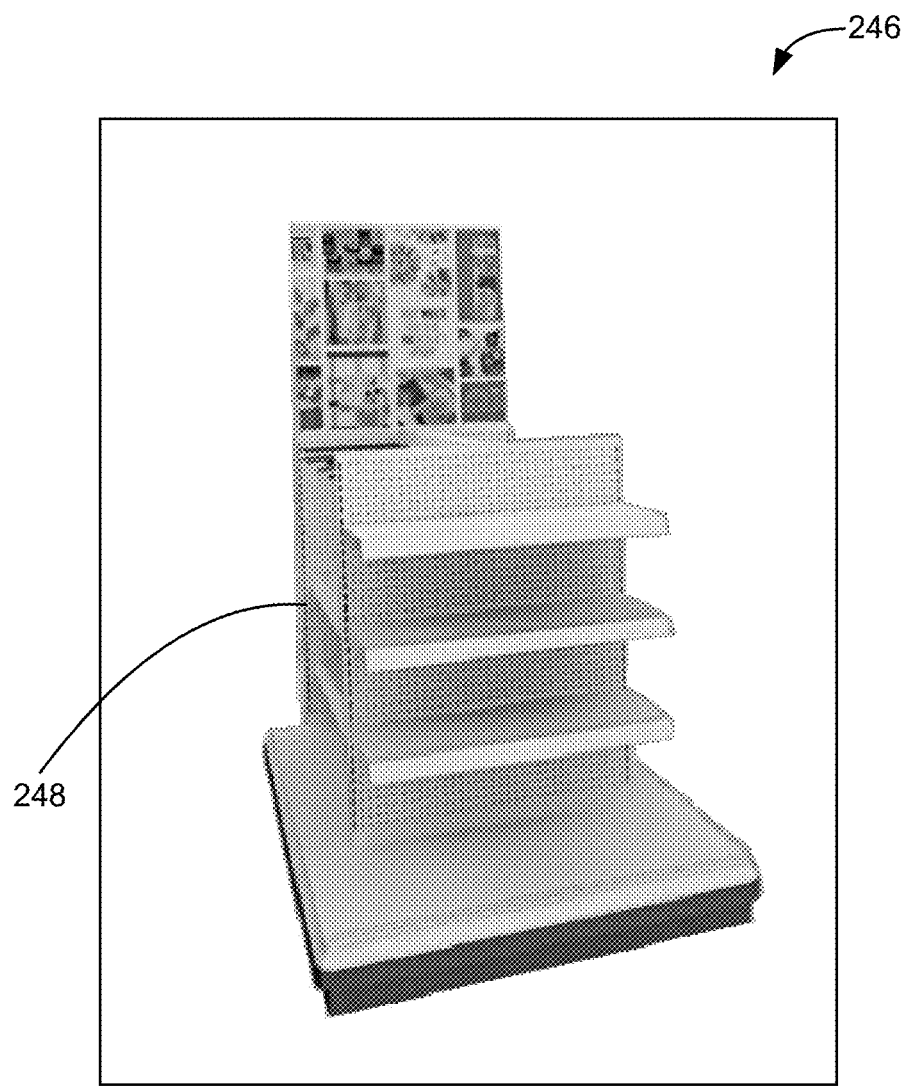
FIG. 14 illustrates a screenshot of yet another exemplary collaborative VR space according to an embodiment.

In still another exemplary collaborative VR space, FIG. 14 illustrates a screenshot 246 of a VR planogram design space. In this simulative environment, users can work independently or collaboratively to design planograms in a retail store. A virtual store layout (for overall context) and a specific editable floor pad are provided along with at least one empty virtual retail display fixture 248 to work on setting product and merchandising the virtual retail display fixture 248 for creation of a planogram. For example, multiple fixtures, mannequins, in-store signage and products may be provided in the store layout. All display fixtures and merchandise in the virtual world are dimensionally related to each other and dimensionally accurate with respect to the real world. With reference back to FIG. 8, a user may use input buttons on touch controllers 104a and 104b to virtually merchandise a virtual display fixture. In particular, grip button 140 on right-hand touch controller 104b may be activated to view a palette of product assets for selection, while grip button 140 on right-hand touch controller 104b may be activated to select and release product assets from the palette.

After entering the VR planogram design space, the user as the user avatar teleports to a targeted position or location to begin merchandising display fixture 248. When in the targeted position, the user depresses grip button 140 on left-hand touch controller 104a to view a virtual palette or menu of product assets 250. Menu of product assets 250 may be product assets provided by a third party. With reference back to FIG. 1, any of the devices used to access virtual reality server 110 may be third party vendors, retail store buyers, retail store planners and etc. Such product assets may be from a three-dimensional repository and include associated metadata.

Figure 15A:
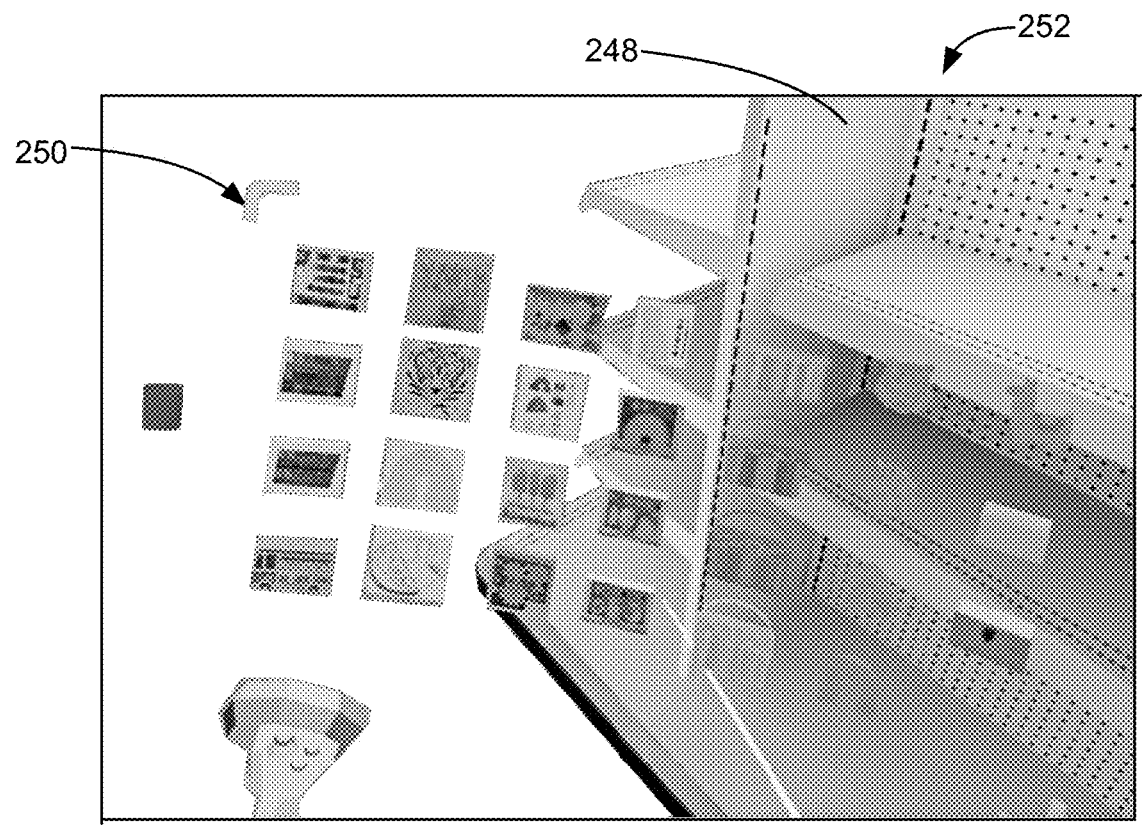
FIGS. 15a-15e illustrate screenshots of the collaborative VR space in FIG. 14 showing the process of virtually merchandising a display fixture for a retail store.
Figure 15B:
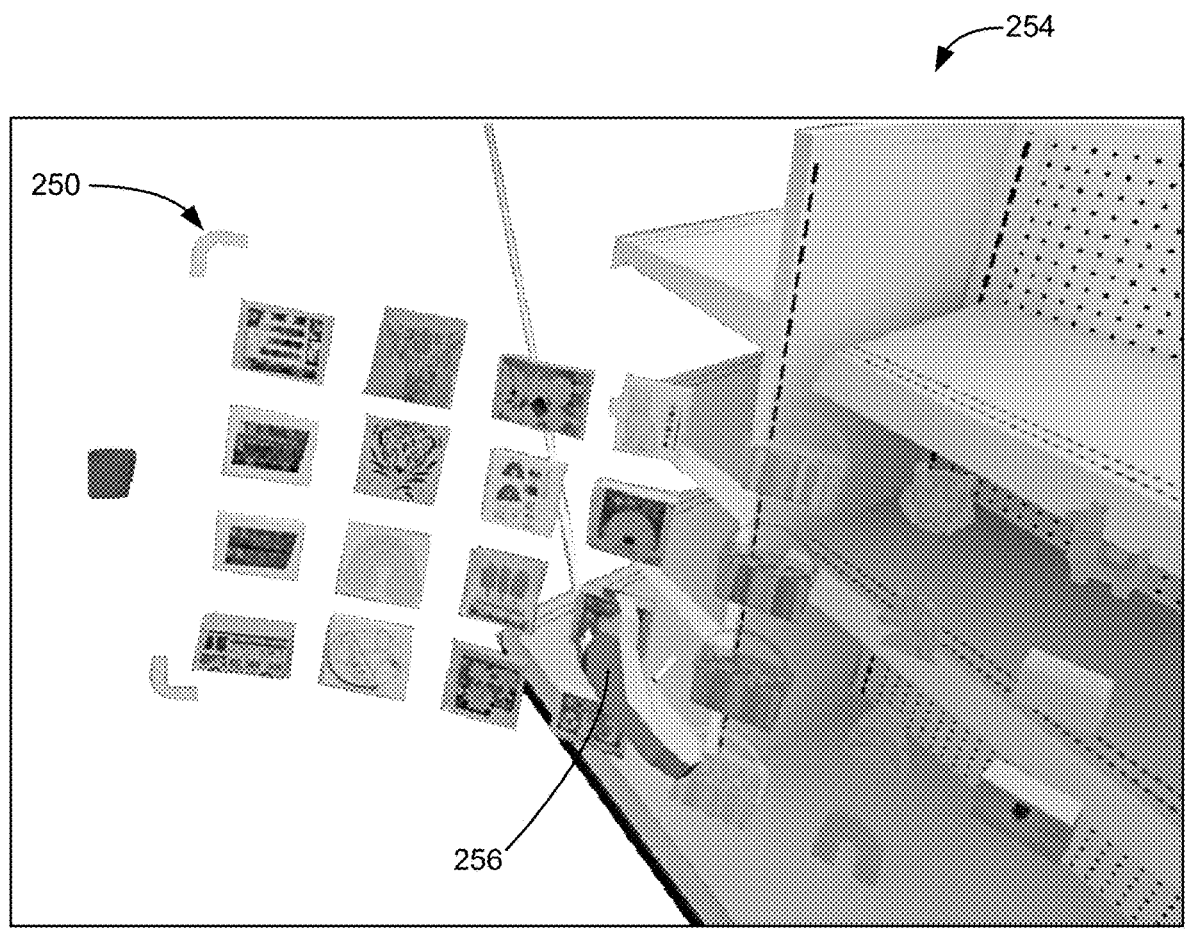
Figure 15C:
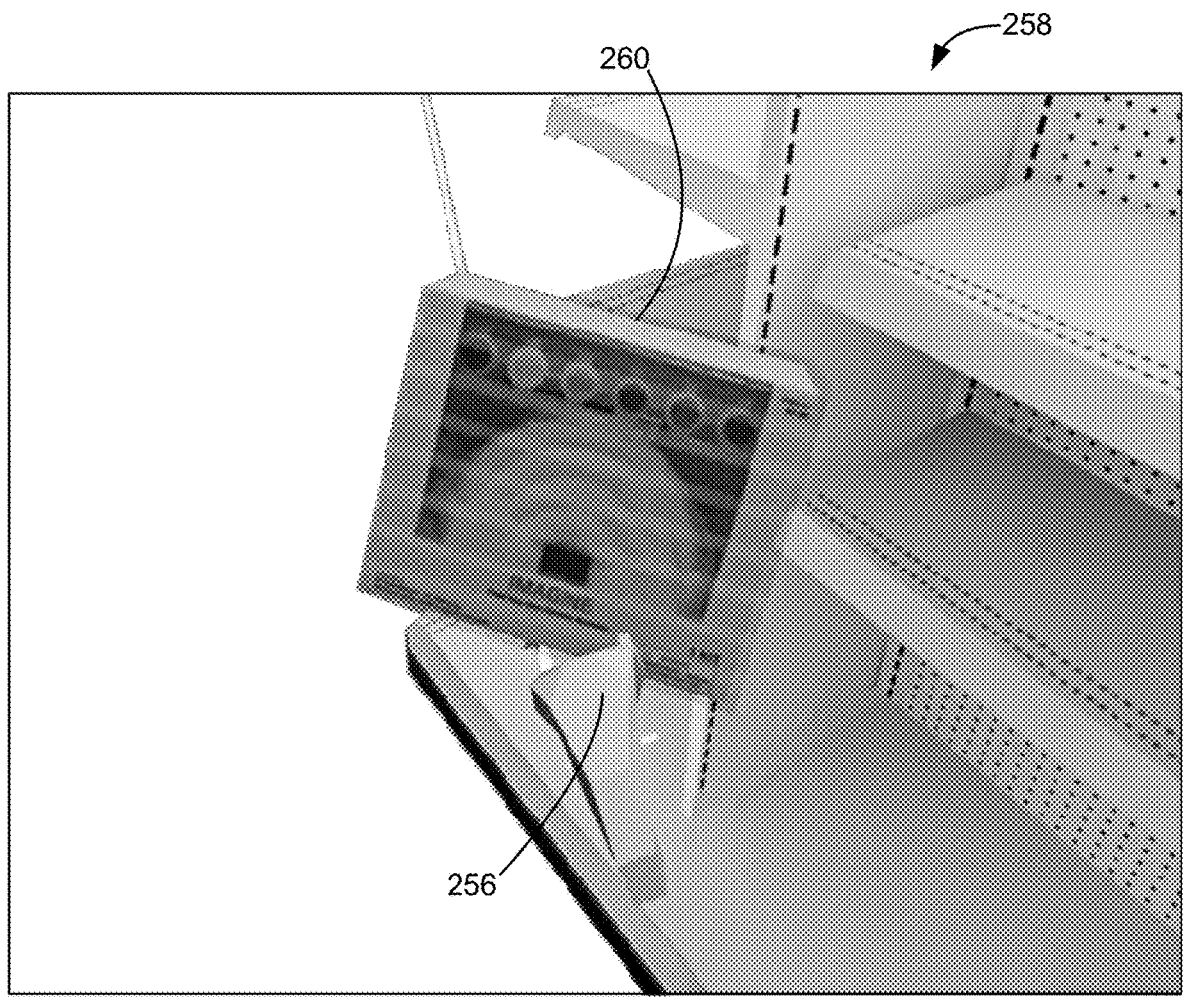

FIG. 15a illustrates a screenshot 252 showing the user avatar located in the targeted position in the VR planogram design space and virtual palette 250. Virtual palette 250 includes a virtual grid of available product assets for the virtual display fixture to be set, such as virtual display fixture 248. To select a virtual product for placement on virtual display fixture 248, the user depresses grip button 140 on the physical right-hand touch controller 104b. Upon depression and as illustrated in screenshot 254 of FIG. 15b, the representative graphical image of touch controller 304b in the VR space is changed to look like a virtual pincer tool 256 in an opened position. The user hovers the physical touch controller 104b rendered in the virtual world as a virtual opened pincer tool 256 on the virtual product to be selected. Upon release of grip button 140 and as illustrated in screenshot 258 of FIG. 15c, virtual pincer tool 256 is rendered in a closed position and holds selected virtual product 260 for placement. It should be realized that a user may merchandise display fixtures using the product assets in the virtual palette, but the user may also access all other available elements or assets through this interface. For example, display fixtures, signs, mannequins and other products.

Figure 15D:
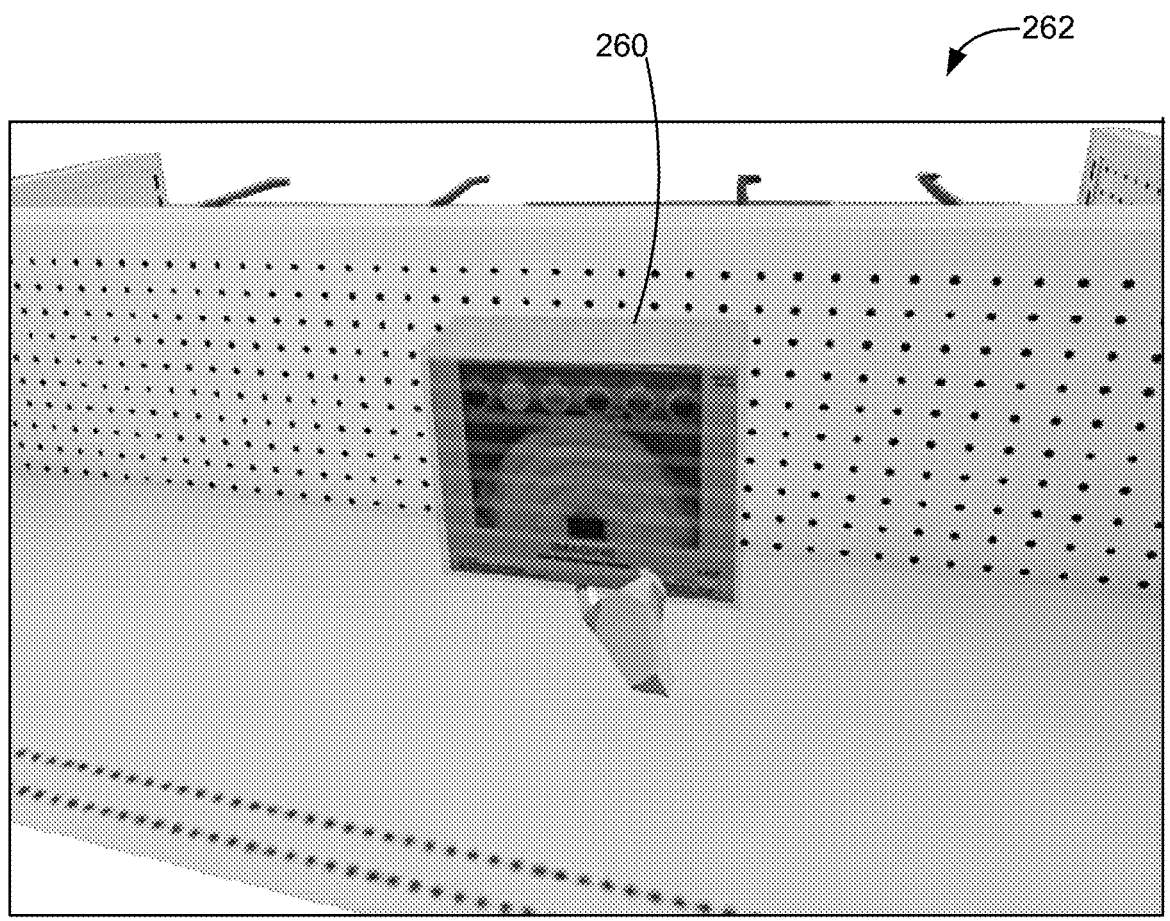
Figure 15E:
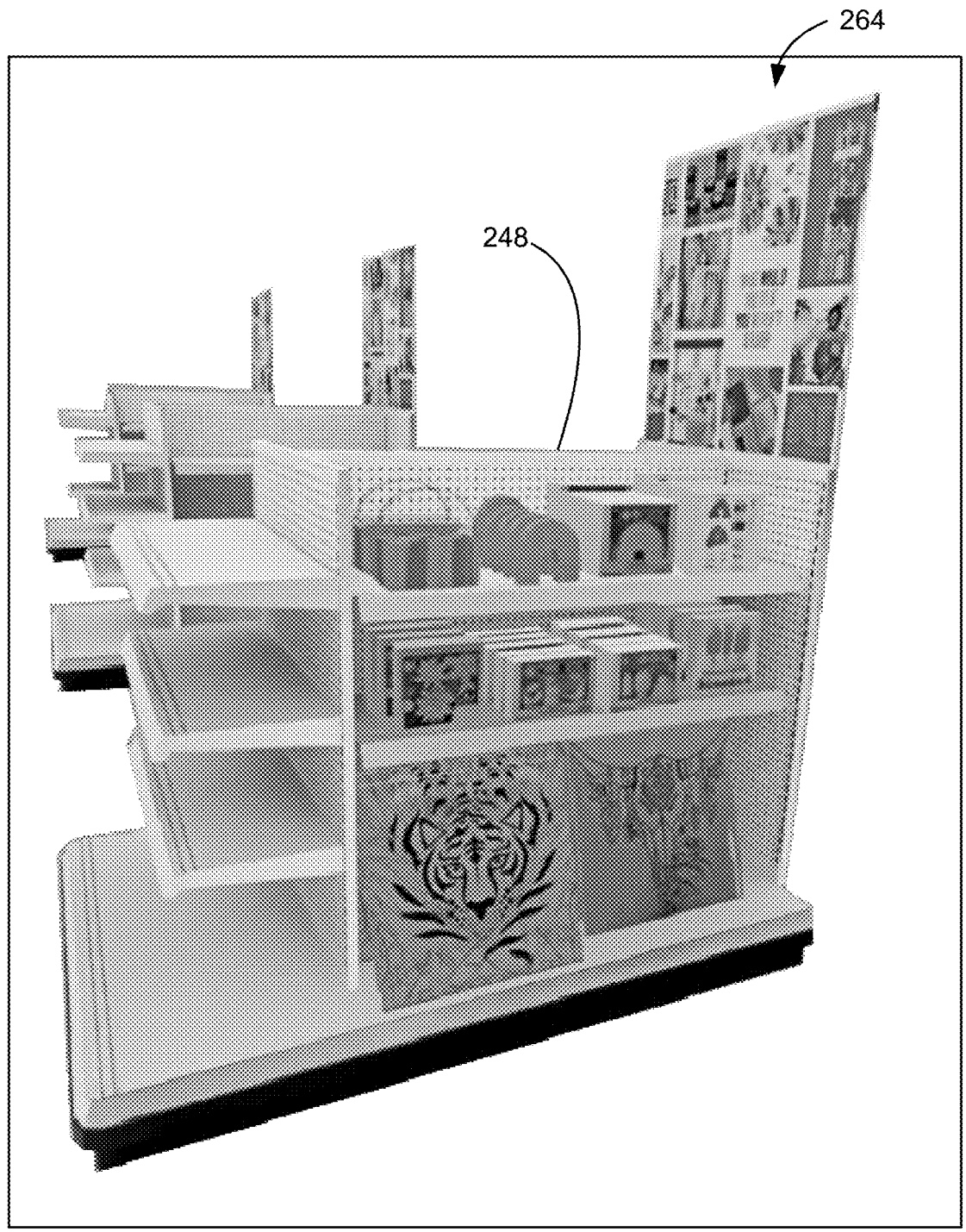

FIG. 15d illustrates a screenshot 262 showing the user as a user avatar setting virtual product assets 260 on virtual display fixture 248. Rather than having to return to virtual palette 250 to select more of the same product assets 260, the user makes duplicates of product asset 250 by using buttons on the physical right-hand touch controller 104b to fill space on the virtual display fixture 248 as desired. As previously described, virtual product assets and virtual display fixtures are dimensionally accurate to the real world so the user can only utilize the space on the virtual display fixture with product as one would in the real world. To load other products from virtual palette 250, the user returns to the virtual palette 250 and selects a different product for placement. FIG. 15e illustrates a screenshot 264 with a portion of virtual display fixture 248 set with virtual products. At any time, the data of virtual products set on virtual display fixture 248 may be exported into planogram files, CAD drawings or 2D plan views as well as 3D models including being exported into augmented reality files.

While the merchandise being set on display fixture 248 in FIGS. 15A-15D are VR hard goods and inherently have constant, unchanged dimensions, embodiments of the innovation also apply to the merchandising of display fixtures with soft goods, such as clothing items, linens and towels. Such soft line items may be merchandised in the real world and virtual world at least in three different types of ways. They may be selected from a virtual palette in folded configurations, hung configurations or a mannequin configurations. Therefore, in the VR space, VR soft line product assets are accessible in four different VR position types: a VR working configuration called a body that includes all of the dimensions of the item, a VR folded configuration that includes dimensions of the item in a folded position, a VR hung configuration that includes dimensions of the item including the hanger that it is attached to in a hung position and one or more VR mannequin configurations that include dimensions for applying to a VR mannequin.

Figure 16:
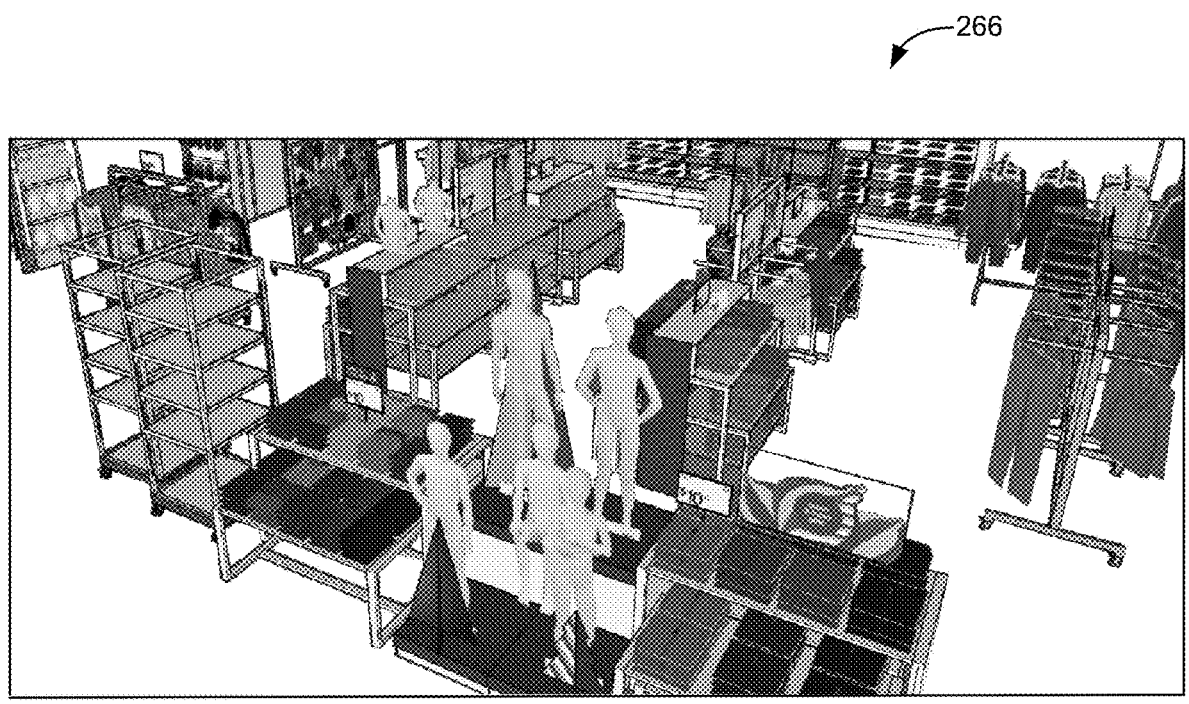
FIG. 16 illustrates a screenshot of a VR space for virtually merchandising display fixtures for soft goods in a retail store.

FIG. 16 illustrates a screenshot 266 showing a virtual retail store space that includes a variety of different VR display fixtures that are configured to receive soft goods. In particular, the VR display fixtures include VR tables for receiving VR folded items, VR racks for receiving VR hanged items and VR mannequins for receiving wearable VR items. Menus for access to these items and VR configuration types will be similarly accessible as are the hard goods illustrated in FIGS. 15a-15e. In other words, such VR soft goods will be selectable from a virtual palette of available VR items and further selectable by VR configuration type. A virtual pincer tool, such as tool 256, may be used to select the VR item to be placed.

In another embodiment, real-time, automatic, non-user manipulation of soft goods is provided during the setting of soft good merchandise. For example, a user avatar selects a VR folded configuration of a clothing item to set on a VR display fixture table. Upon duplication of the selected VR folded item or selection of other VR folded items and placement of the VR folded items on top of each other, the height dimensions of the VR selected item changes. In other words, the VR height of the stack of VR folded items may not equal a multiple of item heights in the folded configuration. The VR height of the stack of VR folded items is less than the multiple of item heights to account for the compression of soft goods when stacked on top of each other. Such logic may include a percentage change in height based on a number of VR folded items stacked together. In this way an accurate representation of how many folded soft goods may be stacked together on a real world display fixture is produced.

In another example, a user avatar selects a VR hanger configuration of a clothing item to set on a VR display fixture rack. Upon duplication of the selected VR hanger item or selection of other VR hanger items and placement of the VR hanger items on a rack, the width dimensions of the VR selected items changes. In other words, the VR width of the side-by-side hanged items may not equal a multiple of item widths in the hanger configuration. The VR width of the side-by-side hanging items may be less than the multiple of item heights to account for the compression of hanging soft goods when placed next to each other on a rack. Such logic may include a percentage change in width based on the number VR hanger items next to each other. In this way, an accurate representation of how many hanging soft goods may be hung side-by-side on a real world display fixture is produced.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A virtual reality system for retail store design comprising
   a network;
   a virtual reality server coupled to the network including a voice streaming server configured to stream audio data;
   a plurality of computing devices coupled to the network and the virtual reality server and each having a display assembly configured to render virtual reality spaces and objects, wherein at least one of the plurality computing devices is a virtual reality headset that includes one or more tracking cameras configured to sense positioning of a user's hands relative to the headset worn by the user, at least one microphone and at least one speaker, wherein a first graphical image is rendered on the display assembly of the headset that is representative of the relative location of at least one of the user's hands in a virtual reality space and is indicative of the at least one user hand being located greater than a threshold distance from the tracking camera on the headset; and
   wherein when the at least one user hand is located within the threshold distance from the tracking camera of the headset the voice streaming server is activated to stream microphone audio data from the microphone to speakers associated with other of the plurality of computing devices and the first graphical image is changed to a second graphical image that is different from the first graphical image.

2. The virtual reality system of claim 1, wherein the second graphical image comprises a graphical image of a handheld microphone.

3. The virtual reality system of claim 1, further comprising a pair of touch controllers associated with the headset and configured to be held in each of the user's hands, wherein the first graphical image is a graphical image of a touch controller on the display assembly of the headset at the relative location of the at least one user hand in the virtual reality space.

4. The virtual reality system of claim 3, wherein when one of the pair of touch controllers is located the threshold distance from the tracking camera of the headset, the voice streaming server is activated to stream microphone audio data and the first graphical image of the touch controller on the display assembly of the headset is changed to the second graphical image that is different from the graphical image of the touch controller.

5. The virtual reality system of claim 4, wherein the second graphical image comprises a graphical image of a handheld microphone.

6. The virtual reality system of claim 1, wherein the first graphical image representative of the at least one user hand are further rendered on the display assemblies of the other of the plurality of computing devices coupled to the network.

7. The virtual reality system of claim 6, wherein when the at least one user hand is located within the threshold distance from the tracking camera of the headset and the voice streaming server is activated to stream microphone audio data then the first graphical image rendered on the display assemblies of the other of the plurality of computing devices is changed to the second graphical image that is different from the first graphical image.

8. The virtual reality system of claim 1, further comprising when the one or more tracking cameras sense that the at least one user hand associated with the headset is inverted then a virtual reality image of a height is rendered on the display assembly of the headset that indicates the quantitative height of the user's hand relative to the virtual reality floor of the virtual reality space.

9. A method of streaming microphone audio data in a virtual reality system for retail store design, the method comprising:
   providing a plurality of computing devices coupled to a network and a virtual reality server each having a display assembly configured to render virtual reality spaces and objects, wherein at least one of the computing devices comprises a virtual reality headset configured to be worn by a user;
   providing at least one microphone and at least one speaker associated with each computing device;
   sensing, with one or more tracking cameras associated with the headset, a position of one of the user's hands relative to the headset worn by the user and rendering a first graphical image on the display assembly of the headset representative of at least one of the use r's hands in a virtual reality space, the first graphical image indicative of the at least one user hand being located greater than a threshold distance from the tracking cameras associated with the headset; and
   activating a voice streaming server to stream microphone audio data from the microphone associated with the headset to speakers associated with the other of the plurality of computing devices and changing the first graphical image to a second graphical image that is different from the first graphical image when the at least one user had is located within the threshold distance from the tracking cameras associated with the headset.

10. The method of claim 9, wherein the second graphical image comprises a graphical image of a handheld microphone.

11. The method of claim 9, further comprising providing a pair of touch controllers associated with the headset and configured to be held in each of the user's hands, wherein the first graphical image is a graphical image of a touch controller on the display assembly of the headset at the relative location of the at least one user hand in the virtual reality space.

12. The method of claim 11, further comprising rendering the second graphical image in place of the rendered first graphical image of the touch controller when at least one of the touch controllers is located within the threshold distance from the tracking cameras associated with the headset and the microphone audio data is streaming.

13. The virtual reality system of claim 12, wherein the second graphical image in place of the first graphical image of the touch controller comprises a graphical image of a handheld microphone.

14. The method of claim 9, further comprising sensing, with one or more tracking cameras associated with the headset, that one of the user's hands relative to the headset is inverted and rendering a graphical image of a height on the display assembly of the headset that indicates the quantitative height of the user's hand relative to the virtual reality floor of the virtual reality space.

15. A virtual reality system for retail store design comprising:
a network;
a virtual reality server coupled to the network and including a voice streaming server configured to stream audio data;
a plurality of computing devices coupled to the network and the virtual reality server and each having a display assembly configured to render virtual reality spaces and objects, wherein at least one of the plurality computing devices is a virtual reality headset including one or more tracking cameras, at least one microphone and at least one speaker and is configured to be worn and operated by a user and at least one associated touch controller configured to be held in one of the user's hands and operated by the user, wherein a first graphical image is rendered on the display assembly of the headset representative of the relative location of the at least one associated touch controller in a virtual reality space and is indicative of the at least one associated touch controller being located greater than a threshold distance from the one or more tracking cameras on the headset; and wherein the one or more tracking cameras associated with the headset are configured to sense a position of the at least one touch controller relative to the virtual reality headset; and wherein when the at least one touch controller associated with the headset is located within the threshold distance from the one or more tracking cameras on the headset microphone audio data from the at least one microphone associated with the headset is activated to stream microphone audio data to other speakers of the plurality of computing devices and the first graphical image is changed to a second graphical image that is different from the first graphical image.

16. The virtual reality system of claim 15, wherein the second graphical image rendered on the display assembly of the headset comprises a handheld microphone.

17. The virtual reality system of claim 15, wherein the first graphical image rendered on the display assembly of the headset at the relative location of the associated touch controller location is an image of a touch controller.

18. The virtual reality system of claim 17, wherein the at least one touch controller comprises a pair of touch controllers associated with the head set and configured to be held in each of the user's hands, wherein when one of the pair of touch controllers is located within the threshold distance from the tracking camera of the headset and the voice streaming server is activated to stream the microphone audio data then the rendered graphical image of one of the touch controllers on the display assembly of the headset is changed to the second graphical image of a handheld microphone.

\* \* \* \* \*